United States Patent
Cao

(10) Patent No.: US 11,360,744 B2
(45) Date of Patent: Jun. 14, 2022

(54) TWO-DIMENSIONAL DATA MATCHING METHOD, DEVICE AND LOGIC CIRCUIT

(71) Applicant: BEIJING QINGYING MACHINE VISUAL TECHNOLOGY CO., LTD., Beijing (CN)

(72) Inventor: Liang Cao, Beijing (CN)

(73) Assignee: BEIJING QINGYING MACHINE VISUAL TECHNOLOGY CO., LTD., Beijing (CN)

( * ) Notice: Subject to any disclaimer, the term of this patent is extended or adjusted under 35 U.S.C. 154(b) by 246 days.

(21) Appl. No.: 16/627,375

(22) PCT Filed: Jun. 29, 2017

(86) PCT No.: PCT/CN2017/090712
§ 371 (c)(1),
(2) Date: Dec. 30, 2019

(87) PCT Pub. No.: WO2019/000300
PCT Pub. Date: Jan. 3, 2019

(65) Prior Publication Data
US 2020/0387354 A1     Dec. 10, 2020

(51) Int. Cl.
*G06F 7/78*     (2006.01)
*G06F 9/30*     (2018.01)
(Continued)

(52) U.S. Cl.
CPC ............ *G06F 7/78* (2013.01); *G06F 9/30021* (2013.01); *G06F 9/30029* (2013.01);
(Continued)

(58) Field of Classification Search
None
See application file for complete search history.

(56) References Cited

U.S. PATENT DOCUMENTS 7,272,622 B2 *   9/2007   Sebot .................... G06F 9/3013
                                                                   708/200
7,685,212 B2 *   3/2010   Sebot ................. G06F 9/30018
                                                                   708/200
(Continued)

FOREIGN PATENT DOCUMENTS

EP          3764251 A2 *   1/2021   ............. H04N 5/378
GN       103839259 A      6/2014
(Continued)

OTHER PUBLICATIONS

Apr. 8, 2018—(WO) International Search Report—Appln. PCT/CN2017/090712.

*Primary Examiner* — Steven G Snyder
(74) *Attorney, Agent, or Firm* — Banner & Witcoff, Ltd.

(57) ABSTRACT

Provided are a two-dimensional data matching method, a device and a logic circuit. The method is executed by a first operator, a first queue, a second operator, a first counter, a second queue, a third operator, a second counter, a first comparator, and a first memory sequentially connected. The method includes: the first operator performs a bitwise matching operation on the matrix a and the matrix b row by row, inputting the result to the first queue; the second operator performs a cumulative operation on the matching result, and outputting an accumulative value to the second queue; the second operator performs a cumulative operation on the accumulative value, and inputs an accumulated result to the first comparator; the first comparator compares the accumulated result with a pre-stored matching threshold, and inputs the comparison result to the first memory to form a matching result matrix; and repeating the above steps.

20 Claims, 6 Drawing Sheets

(51) Int. Cl.
*G06F 16/22* (2019.01)
*G06F 9/54* (2006.01)
*G06T 1/20* (2006.01)
*G06F 17/16* (2006.01)

(52) U.S. Cl.
CPC .......... *G06F 9/30036* (2013.01); *G06F 9/546* (2013.01); *G06F 16/221* (2019.01); *G06F 17/16* (2013.01); *G06T 1/20* (2013.01)

(56) References Cited

U.S. PATENT DOCUMENTS

| | | | |
|---|---|---|---|
| 10,163,227 B1* | 12/2018 | Lester | G06T 9/002 |
| 10,768,895 B2* | 9/2020 | Connor | G06F 9/30018 |
| 11,023,206 B2* | 6/2021 | Connor | G06F 7/5443 |
| 2003/0123748 A1* | 7/2003 | Sebot | G06F 17/147 |
| | | | 382/254 |
| 2003/0131030 A1* | 7/2003 | Sebot | G06F 9/3013 |
| | | | 708/209 |
| 2012/0082387 A1* | 4/2012 | Zhang | G06K 9/4671 |
| | | | 382/201 |
| 2020/0150926 A1* | 5/2020 | Connor | G06F 17/16 |
| 2020/0387350 A1* | 12/2020 | Connor | G06F 17/16 |

FOREIGN PATENT DOCUMENTS

| | | | | |
|---|---|---|---|---|
| GN | 104915322 A | | 9/2015 | |
| GN | 106126481 A | | 11/2016 | |
| KR | 20200071657 A | * | 6/2020 | ............ G06T 11/40 |
| WO | WO-03038601 A1 | * | 5/2003 | ........... G06F 17/147 |

\* cited by examiner

TWO-DIMENSIONAL DATA MATCHING METHOD, DEVICE AND LOGIC CIRCUIT

TECHNICAL FIELD

The present disclosure relates to the technical field of data processing, in particular, to a two-dimensional data matching method, a device and a logic circuit.

BACKGROUND ART

Two-dimensional data generally refer to data that can form a two-dimensional matrix structure, data that can represents a flat image and various flat two-dimensional tabular data. In the operations (or computations) of image recognition, it is sometimes required to traverse two or more images to search for pixel blocks having the same image feature, and it is sometimes required to traverse two specific sets of data or more sets of data with machine learning algorithms to search for data having the same or similar data attributes or feature and to search for their corresponding address locations, and operations or the like for solving visual classification problems are sometimes required in image processing. In the above operations, convolution operations are usually used, in which similarity matching features between two sets of data are judged based on an operation result of an algorithm performed on two sets of images feature blocks within the window range, so as to finally obtain address locations of match-able data among the two sets of data and their corresponding data value and matching parameters.

In the above convolution operations, since the center of each data block is fetched in a pointwise manner according to data bits, there is a large overlapping portion of data between two windows of adjacent centers, while in the operation process, all the overlapping portions participate in the operation, thus a large amount of repetitive operations are produced, which is a huge waste of computing (operation) resources. Meanwhile, convolution operations need to consume a large amount of computing (or operation) resources, including machine hardware resources, as well as operation time resources.

At present, no effective solution has been proposed to solve the problems of low operation efficiency and large operation burdens (or amount).

SUMMARY

In view of this, an object of the present disclosure is to provide a two-dimensional data matching method, a device and a logic circuit, so as to reduce the operation burdens of data matching, and increase the operation efficiency.

In order to realize the above object, a technical solution employed by embodiments of the present disclosure is as follows:

In a first aspect, an embodiment of the present disclosure provides a two-dimensional data matching method, which is executed by a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out. The method includes the following steps: (1) the first operator performing a bitwise matching operation on data in the same data rows (or data lines) in a to-be-matched matrix a and a to-be-matched matrix b in a row-by-row manner; (2) inputting a matching result of the matching operation to a head of the first queue by rows, wherein elements in the first queue are data obtained after the matching operation, and the number of data storage locations of the elements in the first queue is greater than or equal to the number of columns of each of the to-be-matched matrix a and the to-be-matched matrix b, and a length of the first queue is the number of rows of a set matching window; (3) each sub-operator of the second operator performing a cumulative operation using a value at a data storage location corresponding to the inputted matching result, for each matching result inputted to the head of the first queue, wherein the second operator includes a sequence of sub-operators, the number of the sub-operators is equal to the number of data storage locations of the elements in the first queue, and the location of each sub-operator is corresponding to the data storage location of the respective element in the first queue; (4) setting the first counter to zero when each data storage location in the first queue has data stored therein; (5) inputting an accumulative value of each sub-operator of the second operator to a head of the second queue in order of the data storage locations, wherein a length of the second queue is equal to the number of columns of the matching window; (6) the third operator performing a cumulative operation using the inputted accumulative value, for each accumulative value of the respective sub-operator of the second operator which is inputted to the head of the second queue, wherein the third operator is a single operator; (7) setting the value of the second counter to zero when each data storage location in the second queue has data stored therein; (8) inputting the cumulative result in the third operator to the first comparator; (9) the first comparator comparing the cumulative result in the third operator with a pre-stored matching threshold, wherein if the cumulative result in the third operator is greater than or equal to the matching threshold, the comparison result is a first value, if the cumulative result in the third operator is smaller than the matching threshold, the comparison result is a second value, wherein the first value denotes that the comparison result is true, or 1, and the second value denotes that the comparison result is false, or 0; (10) inputting the comparison result to a first memory to form a matching result matrix, wherein abscissas of the matching result matrix in the first memory are values of the second counter, and the ordinates of the matching result matrix are values of the first counter; (11) the second queue pushing data at its tail out of the second queue when each data storage location in the second queue has data stored therein and new data is to be inputted to the head of the second queue, the third operator performing, in the third operator, a cumulative operation using the value of the sub-operator of the second operator corresponding to the newly-inputted data, after the cumulative operation, the third operator performing a deduction operation on the value of the third operator using the data pushed out of the tail of the second queue, and after the deduction operation, adding 1 to the value of the second counter; (12) repeating the steps (8), (9), (10) and (11) until operation values in all the sub-operators of the second operator are all sequentially inputted to the second queue, so as to achieve a complete matching between the current data row in the to-be-matched matrix a and the current data row in the to-be-matched matrix b; (13) after completion of all the steps above, the first queue pushing data at its tail out of the first queue when each data storage location in the first queue has data stored therein and new data is to be inputted to the head of the first queue again, and each sub-operator of the second operator performing the cumulative operation using the value at the data storage location corresponding to the data newly-inputted to the head of the first queue, and after the cumulative operation, each sub-operator performing the deduction operation on the value of the corresponding sub-operator using the value at the data storage location corresponding to the data pushed out of the tail of the first queue, and adding 1 to the first counter; (14) repeating steps (5), (6), (7), (8), (9), (10), (11), (12) and (13) until matching operations for all the data rows in the to-be-matched matrix a and all the data rows in the to-be-matched matrix b are completed.

In an optional embodiment of the present disclosure, the execution of the above method further involves a first controller connected with the first operator, and the method further includes: the first controller acquiring, according to a set order, row data at different locations in the to-be-matched matrix a and in the to-be-matched matrix b in order, wherein the location of the row data in the to-be-matched matrix a which is acquired each time is the same as that in the to-be-matched matrix b; inputting the row data acquired each time to the first operator, wherein the set order at least includes one of the following: acquiring row by row from top to bottom, acquiring row by row from bottom to top, acquiring column by column from left to right, and acquiring column by column from right to left.

In an optional embodiment of the present disclosure, the above method further includes: the first controller generating a marching layer, which includes the following steps: the first controller acquiring a first matrix and a second matrix; the first controller storing the first matrix into a first storage area and storing a second matrix into a second storage area; the first controller moving the second matrix each time by a set unit matching distance according to a set moving path, so as to change an overlapping region between the first matrix and the second matrix; wherein the set moving path includes a linear path or a planar path; the linear path includes one or more of a horizontal linear path, a vertical linear path and an oblique path; the planar path includes a plurality of linear paths of a same type; the first controller generating a matching layer according to an overlapping region produced by each time of movement, wherein the matching layer includes the to-be-matched matrix a, the to-be-matched matrix b and a layer identifier of the matching layer.

In an optional embodiment of the present disclosure, the first matrix and the second matrix described above are two two-dimensional image data matrices acquired by a binocular parallel camera, wherein each two-dimensional image data matrix includes a binary image matrix or a Boolean matrix.

In an optional embodiment of the present disclosure, the above step of the first controller generating a matching layer according to an overlapping region produced by each time of movement includes: the first controller using row numbers and column numbers of an overlapping region in the first matrix as well as data corresponding to the row numbers and the column numbers, as the to-be-matched matrix a; the first controller using row numbers and column numbers of an overlapping region in the second matrix as well as data corresponding to the row numbers and the column numbers, as the to-be-matched matrix b; the first controller using a movement distance of the second matrix as a layer identifier of the matching layer; and the first controller storing the to-be-matched matrix a, the to-be-matched matrix b and the layer identifier as the matching layer.

In an optional embodiment of the present disclosure, the above method further includes: the second controller acquiring, in a one-by-one manner, the respective to-be-matched matrix a and to-be-matched matrix b corresponding to each matching layer to perform a matching operation, then obtaining a matching result matrix and the layer identifier of the matching layer; the second controller setting initial values of all corresponding addresses in the second memory to zero and performing the following operation on the each matching result matrix according to the layer identifier of the respective matching layer, which operation is executed by a second controller, a third queue, a fourth operator, a third counter, a fourth queue, a fifth operator, a fourth counter, a second comparator and a second memory which are sequentially connected, wherein each of the third queue and the fourth queue is a data storage structure, and a data storage rule for the third queue and the fourth queue is first-in first-out. The operation includes the following steps: (1) the second controller acquiring row data in a matching result matrix of the current matching layer in a row-by-row manner and inputting the row data to a head of the third queue, wherein elements in the third queue are row data in the matching result matrix, and the number of data storage locations of the elements in the third queue is greater than or equal to the number of columns of the largest matching result matrix among all the matching result matrices, and a length of the third queue is the number of rows of a set computation window; (2) each sub-operator of the fourth operator performing a cumulative operation using a value at a data storage location corresponding to the inputted row data, for each row of row data inputted to the head of the third queue with the row data being in the matching result matrix of the current matching layer, wherein the fourth operator includes a sequence of sub-operators, the number of the sub-operators is equal to the number of data storage locations of the elements in the third queue, and the location of each sub-operator is corresponding to the data storage location of the respective element in the third queue; (3) setting the third counter to zero when each data storage location in the third queue has data stored therein; (4) inputting an accumulative value of each sub-operator of the fourth operator to a head of the fourth queue in order of the data storage locations, wherein a length of the fourth queue is equal to the number of columns of the set computation window; (5) the fifth operator performing a cumulative operation using the inputted accumulative value, for each accumulative value of the respective sub-operator of the fourth operator which is inputted to the head of the fourth queue, wherein the fifth operator is a single operator; (6) setting the value of the fourth counter to zero when each data storage location in the fourth queue has data stored therein; (7) judging whether a value at a corresponding address in the second memory is zero, wherein an abscissa of the corresponding address is the value of the fourth operator, and an ordinate of the corresponding address is the value of the third operator; wherein if the value at the corresponding address in the second memory is zero, inputting the cumulative result in the fifth operator as well as the layer identifier of the matching layer to the corresponding address in the second memory, if the value at the corresponding address in the second memory is not zero, fetching a stored cumulative result value from a corresponding address in the second memory and inputting the stored cumulative result value to the second comparator, meanwhile, inputting the current cumulative result in the fifth operator to the second comparator; (8) the second comparator comparing the cumulative result in the fifth operator with the cumulative result value fetched from the second memory, wherein if the cumulative result in the fifth operator is greater than or equal to the cumulative result value fetched from the second memory, storing the cumulative result in the fifth operator into the corresponding address in the second memory to replace the cumulative result value fetched from the second memory, meanwhile, storing the layer identifier of the matching layer corresponding to the current matching result matrix into the corresponding address in the second memory to replace the layer identifier originally stored at the corresponding address in the second memory; (9) the fourth queue pushing data at its tail out of the fourth queue when each data storage location in the fourth queue has data stored therein and new data is to be inputted to the head of the fourth queue, the fifth operator performing, in the fifth operator, a cumulative operation using the value corresponding to the data newly-inputted to the fourth queue, after the cumulative operation, the fifth operator performing a deduction operation on the value of the fifth operator using the data pushed out of the fourth queue, and after the deduction operation, adding 1 to the value of the fourth counter; (10) repeating the steps (7), (8) and (9) until accumulative values in all the sub-operators of the fourth operator are all sequentially inputted to the fourth queue, so as to achieve an operation for the current row of the current matching result matrix; (11) after completion of all the steps above, the third queue pushing data at its tail out of the third queue when each data storage location in the third queue has data stored therein and new data is inputted to the head of the third queue again, and each sub-operator of the fourth operator performing the cumulative operation, in the sub-operator, using the value at the data storage location corresponding to the newly-inputted data, and after the cumulative operation is completed, each sub-operator performing the deduction operation on the value of the corresponding sub-operator using the value at the data storage location corresponding to the data pushed out of the third queue, and adding 1 to the value of the third counter; (12) repeating the steps (4), (5), (6), (7), (8), (9), (10) and (11) until operations for all rows in the matching result matrix of the current matching layers are completed; (13) repeating the steps (1)-(12) to complete operations for the next matching result matrix and matching layer until operations for the matching result matrices corresponding to all the matching layers are completed; wherein the second memory is configured to store a final matching result matrix, and each address in the final matching result matrix stores the largest cumulative result value and the layer identifier corresponding to the largest cumulative result value which are obtained after comparing cumulative results of all the matching layers at the corresponding address.

In a second aspect, an embodiment of the present disclosure provides a two-dimensional data matching device, comprising a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out. The first operator is configured to performs a bitwise matching operation on data in the same data rows in a to-be-matched matrix a and a to-be-matched matrix b in a row-by-row manner and the first operator is configured to input a matching result of the matching operation to a head of the first queue by rows, wherein elements in the first queue are data obtained after the matching operation, and the number of data storage locations of the elements in the first queue is greater than or equal to the number of columns of each of the to-be-matched matrix a and the to-be-matched matrix b, and a length of the first queue is the number of rows of a set matching window. The second operator is configured such that each sub-operator of the second operator performs a cumulative operation using a value at a data storage location corresponding to the inputted matching result, for each matching result inputted to the head of the first queue, wherein the second operator includes a sequence of sub-operators, the number of the sub-operators is equal to the number of data storage locations of the elements in the first queue, and the location of each sub-operator is corresponding to the data storage location of the respective element in the first queue. The first counter is configured to set the first counter to zero when each data storage location in the first queue has data stored therein. The second operator is configured to input an accumulative value of each sub-operator of the second operator to a head of the second queue in order of the data storage locations, wherein a length of the second queue is equal to the number of columns of the matching window. The third operator is configured to perform a cumulative operation using the inputted accumulative value, for each accumulative value of the respective sub-operator of the second operator which is inputted to the head of the second queue, wherein the third operator is a single operator. The second counter is configured to set the value of the second counter to zero when each data storage location in the second queue has data stored therein. The third operator is configured to input the cumulative result in the third operator to the first comparator. The first comparator is configured to compare the cumulative result in the third operator with a pre-stored matching threshold, wherein if the cumulative result in the third operator is greater than or equal to the matching threshold, the comparison result is a first value, if the cumulative result in the third operator is smaller than the matching threshold, the comparison result is a second value, wherein the first value denotes that the comparison result is true, or 1, and the second value denotes that the comparison result is false, or 0, and the first comparator is configured to input the comparison result to a first memory to form a matching result matrix, wherein abscissas of the matching result matrix in the first memory are values of the second counter, and the ordinates of the matching result matrix are values of the first counter. The second queue is configured to push data at its tail out of the second queue when each data storage location in the second queue has data stored therein and new data is to be inputted to the head of the second queue. The third operator is configured to perform, in the third operator, a cumulative operation using the value of the respective sub-operator of the second operator corresponding to the newly-inputted data, the third operator is configured to perform a deduction operation on the value of the third operator using the data pushed out of the tail of the second queue after the cumulative operation, and to add 1 to the value of the second counter after the deduction operation. The second operator is configured such that operation values in all the sub-operators of the second operator are all sequentially inputted into the second queue after repeated running of the third operator, the first comparator, the second queue and the third operator according to the steps described above, so as to achieve a complete matching between the current data row in the to-be-matched matrix a and the current data row in the to-be-matched matrix b. The first queue is configured to push data at its tail out of the first queue when each data storage location in the first queue has data stored therein and new data is to be inputted to the head of the first queue again. The second operator is configured such that each sub-operator of the second operator performs the cumulative operation using the value at the data storage location corresponding to the data newly-inputted to the head of the first queue, and each sub-operator of the second operator is configured to perform the deduction operation on the value of the corresponding sub-operator using the value at the data storage location corresponding to the data pushed out of the first queue after the cumulative operation, and to add 1 to the first counter. After repeated running of the second operator, the third operator, the second counter, the third operator, the first comparator, the second queue, the third operator, the second operator and the first queue according to the steps described above, matching operations for all the data rows in the to-be-matched matrix a and all the data rows in the to-be-matched matrix b are completed.

In an optional embodiment of the present disclosure, the above device further includes a first controller connected with the first operator, and the first controller is configured to acquire, according to a set order, row data at different locations in the to-be-matched matrix a and in the to-be-matched matrix b in order, wherein the location of the row data in the to-be-matched matrix a which is acquired each time is the same as that in the to-be-matched matrix b; the first controller is further configured to input the row data acquired each time to the first operator, wherein the set order at least includes one of the following: acquiring row by row from top to bottom, acquiring row by row from bottom to top, acquiring column by column from left to right, and acquiring column by column from right to left.

In an optional embodiment of the present disclosure, the above first controller is further configured to generate a marching layer, which includes the following steps: acquiring a first matrix and a second matrix; storing the first matrix into a first storage area and storing the second matrix into a second storage area; moving the second matrix each time by a set unit matching distance according to a set moving path, so as to change an overlapping region between the first matrix and the second matrix, wherein the set moving path includes a linear path or a planar path, the linear path includes one or more of a horizontal linear path, a vertical linear path and an oblique path, and the planar path includes a plurality of linear paths of a same type; generating a matching layer according to an overlapping region produced by each time of movement, wherein the matching layer includes the to-be-matched matrix a, the to-be-matched matrix b and a layer identifier of the matching layer.

In an optional embodiment of the present disclosure, the above first controller is further configured such that the first matrix and the second matrix include two two-dimensional image data matrices acquired by binocular parallel cameras, wherein each two-dimensional image data matrix includes a binary image matrix or a Boolean matrix.

In an optional embodiment of the present disclosure, the first controller is configured to use row numbers and column numbers of an overlapping region in the first matrix as well as data corresponding to the row numbers and the column numbers, as the to-be-matched matrix a; the first controller is configured to use row numbers and column numbers of an overlapping region in the second matrix as well as data corresponding to the row numbers and the column numbers, as the to-be-matched matrix b; the first controller is configured to use a movement distance of the second matrix as a layer identifier of the matching layer; and to store the to-be-matched matrix a, the to-be-matched matrix b and the layer identifier as the matching layer.

In an optional embodiment of the present disclosure, the above device further includes a second controller, a third queue, a fourth operator, a third counter, a fourth queue, a fifth operator, a fourth counter, a second comparator and a second memory which are sequentially connected, wherein each of the third queue and the fourth queue is a data storage structure, and a data storage rule for the third queue and the fourth queue is first-in first-out; wherein the second controller is configured to acquire, in a one-by-one manner, the respective to-be-matched matrix a and to-be-matched matrix b corresponding to each matching layer to perform a matching operation, then to obtain a matching result matrix and a layer identifier of the matching layer; and the second controller is configured to perform the following operation on the each matching result matrix according to the layer identifier of the respective matching layer: setting initial values of all corresponding addresses in the second memory to zero; acquiring row data in a matching result matrix of the current matching layer in a row-by-row manner and inputting the row data to a head of the third queue, wherein elements in the third queue are row data in the matching result matrix, and the number of data storage locations of the elements in the third queue is greater than or equal to the number of columns of the largest matching result matrix among all the matching result matrices, and a length of the third queue is the number of rows of a set computation window; the fourth operator is configured such that each sub-operator of the fourth operator performs a cumulative operation using a value at a data storage location corresponding to the inputted row data, for each row of row data inputted to the head of the third queue with the row data being in the matching result matrix of the current matching layer, wherein the fourth operator includes a sequence of sub-operators, the number of the sub-operators is equal to the number of data storage locations of the elements in the third queue, and the location of each sub-operator is corresponding to the data storage location of the respective element in the third queue; the third counter is configured to set the third counter to zero when each data storage location in the third queue has data stored therein;

the fifth operator is configured to input an accumulative value of each sub-operator of the fourth operator to a head of the fourth queue in order of the data storage locations, wherein a length of the fourth queue is equal to the number of columns of the set computation window; the fifth operator is configured to perform a cumulative operation using the newly-inputted accumulative value, for each accumulative value of the respective sub-operator of the fourth operator which is inputted to the head of the fourth queue, wherein the fifth operator is a single operator; the fourth counter is configured to set the fourth counter to zero when each data storage location in the fourth queue has data stored therein; the second controller is further configured to judge whether a value at a corresponding address in the second memory is zero, wherein an abscissas of the address is the value of the fourth counter and an ordinate of the address is the value of the third counter, wherein if the value at the corresponding address in the second memory is zero, the second controller inputs the cumulative result in the fifth operator and the layer identifier of the matching layer to a corresponding address in the second memory, and if the value at the corresponding address in the second memory is not zero, the second controller fetches the stored cumulative result value from the corresponding address in the second memory and inputs the stored cumulative result value to the second comparator, meanwhile, inputs the current cumulative result in the fifth operator to the second comparator; the second comparator is configured to compare the cumulative result in the fifth operator with the cumulative result value fetched from the second memory, wherein if the cumulative result in the fifth operator is greater than or equal to the cumulative result value fetched from the second memory, the second comparator stores the cumulative result in the fifth operator into the corresponding address in the second memory to replace the cumulative result value fetched from the second memory, meanwhile, the second comparator stores the layer identifier of the matching layer corresponding to the current matching result matrix into the corresponding address in the second memory to replace the layer identifier originally stored at the corresponding address in the second memory; the fourth queue is configured to push data at its tail out of the fourth queue when each data storage location in the fourth queue has data stored therein and new data is to be inputted to the head of the fourth queue; the fifth operator is configured to perform, in the fifth operator, a cumulative operation using the value corresponding to the data newly-inputted to the fourth queue, and to perform a deduction operation on the value of the fifth operator using the data pushed out of the fourth queue after the cumulative operation, and to add 1 to the value of the fourth counter after the deduction operation; the fourth operator is configured such that operation values in all the sub-operators of the fourth operator are all sequentially inputted into the fourth queue after repeated running of the second controller, the second comparator, the fourth queue and the fifth operator, so as to achieve operations for the current data row in the matching result matrix; the third queue is configured to push data at its tail out of the third queue when each data storage location in the third queue has data stored therein and new data is to be inputted to the head of the third queue; the fourth operator is configured such that each sub-operator of the fourth operator performs the cumulative operation using the value at the data storage location corresponding to the data newly-inputted to the head of the third queue, and each sub-operator of the fourth operator is configured to perform the deduction operation on the value of the corresponding sub-operator using the value at the data storage location corresponding to the data pushed out of the third queue after the cumulative operation, and to add 1 to the third counter; and the second controller is configured to repeatedly trigger running of the fourth operator, the fifth operator, the fourth counter, the second controller, the second comparator, the fourth queue, the fifth operator, the fourth operator, the third queue and the fourth operator until matching operations for all the rows in the matching result matrix of the current matching layer are completed; the second controller is further configured to repeatedly trigger running of from the second controller to the fourth operator to achieve the operations for the next matching result matrix and matching layer, until operations for matching result matrices corresponding to all the matching layers are completed, wherein the second memory is configured to store a final matching result matrix, and each address in the final matching result matrix stores the largest cumulative result value and its layer identifier which are obtained after comparing cumulative results of all the matching layers at the corresponding address.

In a third aspect, an embodiment of the present disclosure provides a two-dimensional data matching logic circuit, including the above two-dimensional data matching device.

Embodiments of the present disclosure provide a two-dimensional data matching method, a device and a logic circuit, in which the method is executed by a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out. The first operator performs, in a row-by-row manner, a bitwise matching operation on data in the same data rows in a to-be-matched matrix a and a to-be-matched matrix b and inputs a matching result to the first queue. Each sub-operator of the second operator performs a cumulative operation using a value at a data storage location corresponding to the inputted matching result. The third operator performs a cumulative operation using the accumulative value inputted to the second queue. The first comparator compares the cumulative result in the third operator with a pre-stored matching threshold and inputs the comparison result to the first memory to form a matching result matrix. The above steps are repeated until operation values of all the sub-operators of the second operator are sequentially inputted to the second queue, and a complete matching between all data rows of the to-be-matched matrix a and the to-be-matched matrix b is achieved. When data blocks in two-dimensional data are to be matched in such way, it is feasible that operations are performed only on varying data portions between adjacent data blocks, while no operation is performed on overlapped data portions, thus reducing a large amount of repetitive operations, which greatly lowers the operation burdens of the data matching, and increases the operation efficiency of the data matching. Meanwhile, due to use of such queue mode for storing intermediate process data, the storage space can be economized to a great extent, which facilitates data access operations and greatly improves the operation speed.

Other features and advantages of the present disclosure are to be set forth in the subsequent specification, and partly be apparent from the specification or understood from the implementation of the present disclosure. The objects and other advantages of the present disclosure can be realized and obtained by structures specifically indicated in the specification, claims and drawings. In order to make the above-mentioned objects, features and advantages of the present disclosure more apparent and understandable, preferred embodiments are given below in connection with the drawings, and the detailed description of which is as follows.

BRIEF DESCRIPTION OF DRAWINGS

In order to more clearly describe technical solutions of the embodiments of the present disclosure or the prior art, brief descriptions on the drawings required to be used for describing the embodiments or the prior art are made below, it is apparent that the drawings to be described below are illustrative of some embodiments of the present disclosure, for those of ordinary skills in the art, other drawings can also be obtained based on these drawings.

DETAILED DESCRIPTION OF EMBODIMENTS

In order to further clarify the objects, technical solutions and advantages of the embodiments of the present disclosure, the technical solutions of the present disclosure are to be clearly and entirely described below in combination with drawings, it is apparent that the embodiments to be described are some, rather than all of the embodiments of the present disclosure. All other embodiments obtained based on the embodiments of the present disclosure by those of ordinary skills in the art without any inventive effort shall fall within the scope of protection of the present disclosure.

Regarding the problems of low operation efficiency and heavy operation burdens of the existing two-dimensional data matching method, embodiments of the present disclosure provides a two-dimensional data matching method, a device and a logic circuit, the technique of which is applicable to a similarity matching process of two or more sets of two-dimensional data, and is particularly applicable to a similarity matching process in which images are acquired by binocular or multi-camera photographic devices, evidently it is also possible to use four-camera or eight-camera parallel photographic devices, etc., and for the sake of simplicity, binocular parallel cameras are taken herein as an example for illustration, the technique can be implemented by relevant hardware or software, which is to be described in the embodiments below.

Embodiment 1

Figure 1:
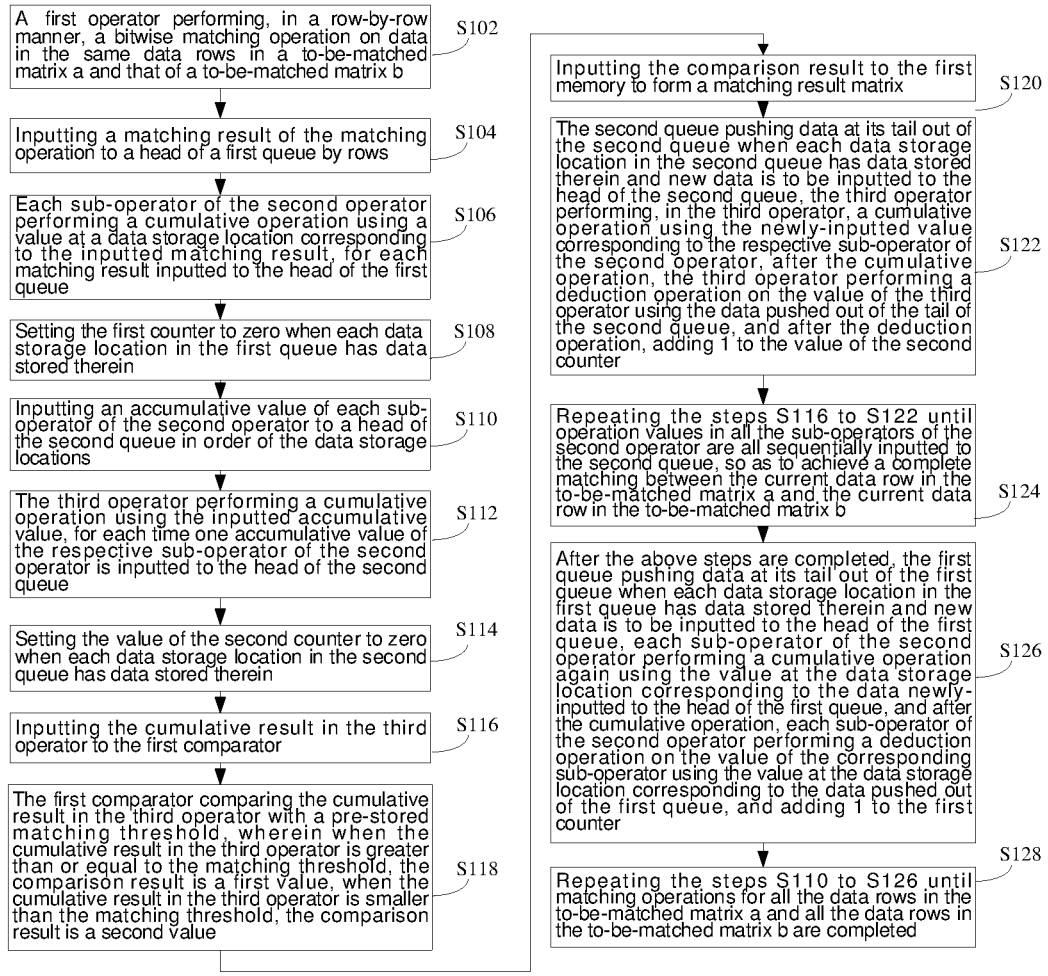
FIG. 1 is a flowchart of a two-dimensional data matching method according to an embodiment of the present disclosure.
Figure 5:
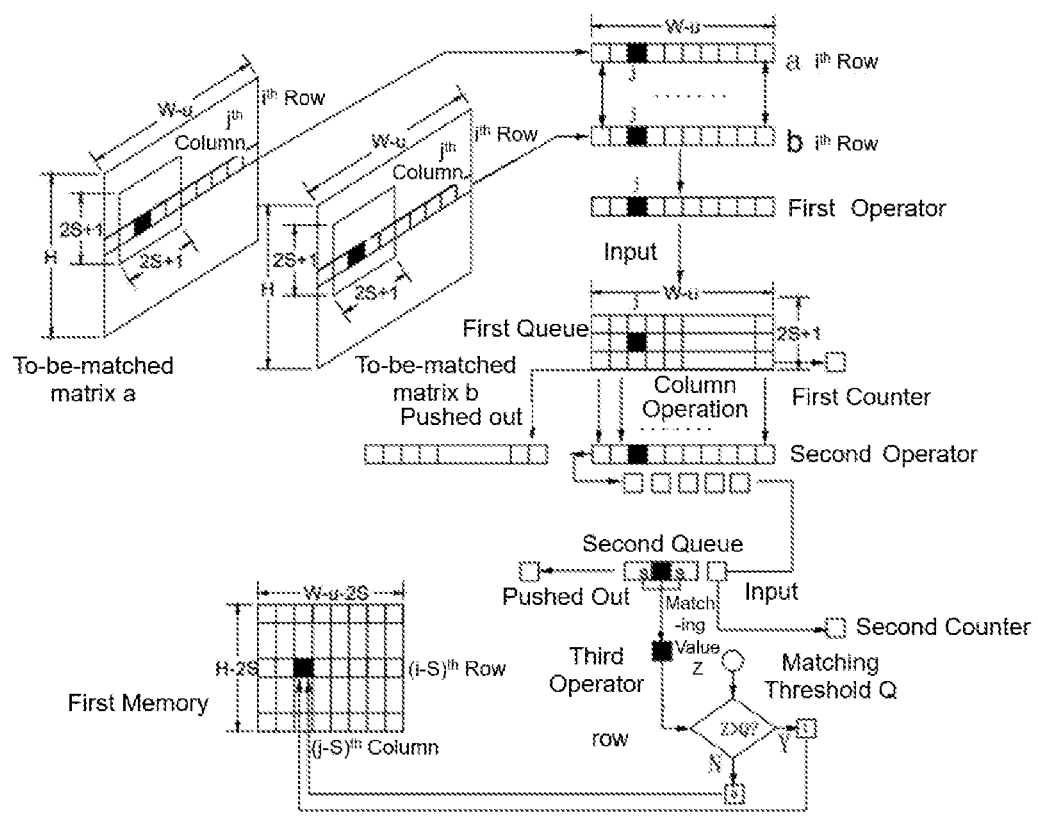
FIG. 5 is a schematic diagram of an operation flow of a layer-by-layer layer matching operation method according to an embodiment of the present disclosure.

Referring to FIG. 1, it is a flowchart of a two-dimensional data matching method, and referring to FIG. 5, it is a schematic diagram of an operation flow of a layer-by-layer layer matching operation method. The method is executed by a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out;

wherein each of the first operator, the second operator and the third operator can be data operation process, method or circuit, which includes logical operations and numerical operations including but not limited to additive operations and a combination of multiple operations. An object of the two-dimensional data matching method provided in the embodiment of the present disclosure is: in a to-be-matched matrix a and a to-be-matched matrix b having a same size, calculating a match value between two data blocks in a range of a rectangle window having a certain number of rows and columns in a corresponding data location area, and meanwhile, giving a judgment on the matching result. In the embodiment of the present disclosure, the size of each of the to-be-matched matrix a and the to-be-matched matrix b is set to be $(W-u) \times H$, where $W-u$ denotes the number of columns and H denotes the number of rows of the corresponding matrix, and the size of the rectangle window for data matching is $(2s+1) \times (2s+1)$, where s denotes a distance between matching point at the data center and the adjacent relevant data points.

The above method includes the following steps:

S102: a first operator performing, in a row-by-row manner, a bitwise matching operation on data in the same data rows in a to-be-matched matrix a and that of a to-be-matched matrix b;

S104: inputting a matching result of the matching operation to a head of a first queue by rows, wherein elements in the first queue are data obtained after the matching operation, and the number of data storage locations of the elements in the first queue is greater than or equal to the number of columns of each of the to-be-matched matrix a and the to-be-matched matrix b, and a length of the first queue is the number of rows of a set matching window;

For example, the first operator acquires row data i form the to-be-matched matrix a, and acquires row data i form the to-be-matched matrix b, wherein a length of each row data i is $W-u$, that is to say, each row data i includes $W-u$ pieces of data; the first operator performs a matching operation between the first column of data in row data i of the to-be-matched matrix a and the first column of data in row data i of the to-be-matched matrix b, and stores the matching result at a corresponding location in the first column of the first operator, then the first operator performs a matching operation between the second column of data in the row data i of the to-be-matched matrix a and the second column of data in the row data i of the to-be-matched matrix b, and stores the matching result at a corresponding location in the second column of the first operator, and the rest can be done in the same manner, until the first operator performs a matching operation between the $W-u^{th}$ column of data in the row data i of the to-be-matched matrix a and the $W-u^{th}$ column of data in the row data i of the to-be-matched matrix b, and stores the matching result at a corresponding location in the $W-u^{th}$ column of the first operator, so far, the above-mentioned matching result is generated, and at this moment, the matching result is row data having a length of $W-u$.

The number of data elements in the first queue (or array) is the maximum number of columns of the to-be-matched matrix a and the to-be-matched matrix b, i.e., W, which number is greater than the number of data rows $W-u$. Setting of the maximum number is used for meeting all possible matching operations, and for an operation in which the number of data rows is smaller than the number of data elements, the operation can be performed without involving the data storage locations of the empty elements at the tail of the first queue into the operation; the length of the first queue is set to be the number of rows of the matching window, which may be set to be, for example, $2s+1$; generally, the value of $2s+1$ is no greater than the number of rows or columns of each of the to-be-matched matrix a and the to-be-matched matrix b; optionally, in the value of $2s+1$, the value of "s" may be any natural number between 1 and 30. The above matching operations include, but are not limited to the following operations: logical AND, logical XOR, addition, subtraction, and an algorithm formed by a combination thereof.

S106: each sub-operator of the second operator performing a cumulative operation using a value at a data storage location corresponding to the inputted matching result, for each matching result inputted to the head of the first queue, wherein the second operator includes a sequence of sub-operators, the number of the sub-operators is equal to the number of data storage locations of the elements in the first queue, and the location of each sub-operator is corresponding to the data storage location of the respective element in the first queue;

S108: setting the first counter to zero when each data storage location in the first queue has data stored therein;

The value of each sub-operator of the second operator is an accumulative value of the data storage location of the respective element in the vertical of the queue, and the values of the sub-operators are corresponding to accumulative values of (2s+1) columns of the matching window in the column direction.

S110: inputting an accumulative value of each sub-operator of the second operator to a head of the second queue in order of the data storage locations, wherein the length of the second queue is equal to the number of columns of the matching window;

S112: performing a cumulative operation using the inputted accumulative value, for each time one accumulative value of the respective sub-operator of the second operator is inputted to the head of the second queue, wherein the third operator is a single operator;

S114: setting the value of the second counter to zero when each data storage location in the second queue has data stored therein;

The value of the third operator is an accumulative value of the accumulative values of the sub-operators of the second operator in the direction of the data storage locations of the elements of the second queue. This value is corresponding to an accumulative value of the accumulative values of (2s+1) rows and (2s+1) columns in the row direction of the matching window, and this value is also the total accumulative value of data at all the data storage locations in the (2s+1)×(2s+1) matching window. This value also represents a matching degree between a data point at the center of the matching window in the to-be-matched matrix a and a data point at the center of the matching window in the to-be-matched matrix b. Generally, the larger the value is, the higher the matching degree between the two data points.

S116: inputting the cumulative result in the third operator to the first comparator;

S118: the first comparator comparing the cumulative result in the third operator with a pre-stored matching threshold, wherein when the cumulative result in the third operator is greater than or equal to the matching threshold, the comparison result is a first value, when the cumulative result in the third operator is smaller than the matching threshold, the comparison result is a second value, wherein the first value denotes that the comparison result is true, or 1, and the second value denotes that the comparison result is false, or 0;

The pre-stored matching threshold represents a threshold which the matching degree between the two matching points (data points) has to meet, if the matching degree is above the threshold, it indicates that the two matching points are successfully matched, and if the matching degree is lower than the threshold, it indicates that the two matching points do not meet the condition of matching, thus the matching has failed. The threshold may be set according to application scenarios, the larger the threshold is set, the fewer matching points which are matched with success, and the smaller the threshold is set, the more matching points which are matched with success.

S120: inputting the comparison result to the first memory to form a matching result matrix, wherein abscissas of the matching result matrix in the first memory are values of the second counter, and ordinates of the matching result matrix are values of the first counter;

The matching results stored in the matching result matrix are corresponding to the matching result between a data point which is located at the left upper corner of the to-be-matched matrix and around which a periphery having a width of s is removed and a data point which is located at the left upper corner of the to-be-matched matrix b and around which a periphery having a width of s is removed, that is to say, it is the matching result between a point at coordinate (s+1, s+1) in the to-be-matched matrix a and a point at coordinate (s+1, s+1) in the to-be-matched matrix b based on the coordinates of the original to-be-matched matrix a and the original to-be-matched matrix b. The coordinate in the matching result matrix corresponding to the two data points is (0, 0)

S122: the second queue pushing data at its tail out of the second queue when each data storage location in the second queue has data stored therein and new data is to be inputted to the head of the second queue, the third operator performing, in the third operator, a cumulative operation using the newly-inputted value corresponding to the respective sub-operator of the second operator, after the cumulative operation, the third operator performing a deduction operation on the value of the third operator using the data pushed out of the tail of the second queue, and after the deduction operation, adding 1 to the value of the second counter;

The accumulative value of the third operator represents the matching result between a data point at coordinate (s+2, s+1) in the to-be-matched matrix a and a point at coordinate (s+2, s+1) in the to-be-matched matrix b;

It can be seen that the pre-existing results of matching operations are adequately utilized in the operations of this step, and accumulation is performed only on the data of matching newly added to the head, and then the data at the tail of the second queue is removed, which greatly reduces repetitive operations, moreover, the use of queue structure can greatly economize the storage space for intermediate data, which facilitates the data access operations.

S124: repeating the steps S116 to S122 until operation values in all the sub-operators of the second operator are all sequentially inputted to the second queue, so as to achieve a complete matching between the current data row in the to-be-matched matrix a and the current data row in the to-be-matched matrix b;

The matching result stored in the matching result matrix is corresponding to all the data points in the $(s+1)^{th}$ row of the to-be-matched matrix a and those in the $(s+1)^{th}$ row of the to-be-matched matrix b, wherein a periphery having a width of s around each of the data points is removed, and the data points are corresponding to the matching results of a data matching window with a size of (2s+1)×(2s+1). For the matching result matrix, that is to say, the matching result operations for all the data points in the 0th row are completed.

S126: after the above steps are completed, the first queue pushing data at its tail out of the first queue when each data storage location in the first queue has data stored therein and new data is to be inputted to the head of the first queue, each sub-operator of the second operator performing a cumulative operation again using the value at the data storage location corresponding to the data newly-inputted to the head of the first queue, and after the cumulative operation, each sub-operator of the second operator performing a deduction operation on the value of the corresponding sub-operator using the value at the data storage location corresponding to the data pushed out of the first queue, and adding 1 to the first counter;

The values of the sub-operators of the second operator are accumulative values of elements at the data storage locations in the vertical direction of the first queue which are corresponding to rows from the 2nd row to the $(2s+2)^{th}$ row of each of the to-be-matched matrix a and the to-be-matched matrix b;

The pre-existing results of matching operations are adequately utilized in the operations of this step as well, and accumulation is performed only performed the data of matching newly added to the head only, and then the data at the tail of the second queue is removed, which greatly reduces repetitive operations, moreover, the use of queue structure can greatly economize the storage space for intermediate data, which facilitates the data access operations.

S128: repeating the steps S110 to S126 until matching operations for all the data rows in the to-be-matched matrix a and all the data rows in the to-be-matched matrix b are completed.

Each time the above steps are repeated, matching operations between one data row in the to-be-matched matrix a and one data row in the to-be-matched matrix b, and one row of results of matching operation is added to the matching result matrix until matching for all the rows are completed. After completion of the matching, it can be seen that each row of the matching result matrix has 2s reduced (or less) data storage locations as compared with the to-be-matched matrices and each column of the matching result matrix has 2s reduced data storage locations as compared with the to-be-matched matrices.

The embodiment of the present disclosure provides a two-dimensional data matching method which is executed by a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out. The first operator performs, in a row-by-row manner, a bitwise matching operation on data in the same data rows in a to-be-matched matrix a and a to-be-matched matrix b and inputs a matching result to the first queue. Each sub-operator of the second operator performs a cumulative operation using a value at a data storage location corresponding to the inputted matching result. The third operator performs a cumulative operation on the accumulative value inputted to the second queue. The first comparator compares the cumulative result in the third operator with a pre-stored matching threshold and inputs the comparison result to the first memory to form a matching result matrix. The above steps are repeated until operation values of all the sub-operators of the second operator are sequentially inputted to the second queue, and a complete matching between all data rows of the to-be-matched matrix a and the to-be-matched matrix b is achieved. When data blocks of two-dimensional data are to be matched in such way, it is feasible that operations are performed only on varying data portions between adjacent data blocks, while no operation is performed on overlapped data portions, thus reducing a large amount of repetitive operations, which greatly lowers the operation burdens of the data matching, and increases the operation efficiency of the data marching. Meanwhile, due to use of such queue mode for storing intermediate process data, the storage space can be economized to a great extent, which facilitates data access operations and greatly improves the operation speed.

Embodiment 2

An embodiment of the present disclosure provides a flowchart of a second two-dimensional data matching method, which may be implemented on the basis of the two-dimensional data matching method provided in Embodiment 1, the second two-dimensional data matching method is executed by a first controller, a first operator, a first queue, a second operator, a first counter, a second queue, a third operator, a second counter, a first comparator and a first memory which are sequentially connected, as well as by a second controller, a third queue (or array), a fourth operator, a third counter, a fourth queue, a fifth operator, a fourth counter, a second comparator and a second memory which are sequentially connected, wherein each of the third queue and the fourth queue is a data storage structure, and a data storage rule for the third queue and the fourth queue is first-in first-out; each of the fourth operator and the fifth operator may be a data operation process, method or circuit, which includes logical operations and numerical operations including but not limited to additive operations and a combination of multiple operations.

The method first includes steps of the first controller generating a matching layer, which includes the following steps 1-4:

Step 1: the first controller acquiring a first matrix and a second matrix;

Step 2: the first controller storing the first matrix in a first storage area and storing a second matrix in a second storage area;

Step 3: the first controller moving the second matrix by a set unit matching distance according to a set moving path, so as to change an overlapping region between the first matrix and the second matrix, wherein the set moving path includes a linear path or a planar path, the linear path includes one or more of a horizontal linear path, a vertical linear path and an oblique path, and the planar path includes a plurality of linear paths of a same type;

Step 4: the first controller generating a matching layer according to an overlapping region produced by each time of movement, wherein the matching layer includes the to-be-matched matrix a, the to-be-matched matrix b and a layer identifier of the matching layer. Specifically, the first controller is configured to use row numbers and column numbers of an overlapping region in the first matrix as well as data corresponding to the row numbers and the column numbers, as the to-be-matched matrix a; the first controller is configured to use row numbers and column numbers of an overlapping region in the second matrix as well as data corresponding to the row numbers and the column numbers, as the to-be-matched matrix b; the first controller is configured to use a movement distance of the second matrix as a layer identifier of the matching layer; and to store the to-be-matched matrix a, the to-be-matched matrix b and the layer identifier as the matching layer. The first matrix and the second matrix described above are two two-dimensional image data matrices acquired by a binocular parallel camera, wherein each two-dimensional image data matrix includes a binary image matrix or a Boolean matrix.

The two-dimensional data matching method provided in the embodiment of the present disclosure is applicable to various two-dimensional data, for example, a two-dimensional matrix structure data, data that represents a flat image, various flat two-dimensional tabular data and the like, the method is particularly applicable to two-dimensional image data matrices, for example, two-dimensional image data matrices acquired by a binocular parallel camera; optionally, the method is also applicable to binary image matrices and Boolean matrices; and sources and specific representation forms of the two-dimensional data are not limited in the embodiment of the present disclosure.

In an initial state, there is no coincidence between row numbers and column numbers of the first storage area which are occupied by all data in the first matrix and row numbers and column numbers of the second storage area which are occupied by all data in the second matrix; for example, the second matrix is located on the horizontal left side, horizontal right side, vertical upper side, vertical lower side or the like of the first matrix. The horizontal linear path may be the second matrix moving from the left side of the matrix to the right side of the first matrix, the vertical linear path may be the second matrix moving from the upper side of the matrix to the lower side of the first matrix; and the planar path may include multiple horizontal linear paths, for example, the second matrix moves horizontally from the left upper corner of the first matrix to the right side of the first matrix, when arriving at the right upper corner of the first matrix, the second matrix shifts down by a distance of one data point and continues to move towards the left side of the first matrix, and the rest can be done in the same manner. A unit movement distance of the above movement may be set according to application scenarios, and optionally, the unit movement distance may be one data point.

During the above steps 1-4, a plurality of matching layers can be generated from a set of first matrices and second matrices, wherein each matching layer includes a part of or all of the overlapped data in the first matrix and the second matrix; the subsequent two-dimensional data matching operations are only performed on the overlapped data, and no matching operation is performed on data that does not involve the overlapping, for this reason, by providing the matching layers, operation burdens of data matching can be reduced, thereby improving the operation efficiency of data matching.

The above method further includes Step 5: the first controller acquiring, for each matching layer and according to a set order, row data at different locations in the to-be-matched matrix a and in the to-be-matched matrix b in order, wherein the location of the row data in the to-be-matched matrix a which is acquired each time is the same as that in the to-be-matched matrix b; the first controller inputting the row data acquired each time to the first operator, wherein the set order at least includes one of the following: acquiring row by row from top to bottom, acquiring row by row from bottom to top, acquiring column by column from left to right, and acquiring column by column from right to left. Optionally, the first controller is configured to acquire rows of the two to-be-matched matrices in a row-by-row manner from top to bottom, and the first operator is configured to acquire row data of the $i^{th}$ row of the to-be-matched matrix a and to acquire row data of the $i^{th}$ row of the to-be-matched matrix b as well.

After Step 5, the steps S102-S128 provided in Embodiment 1 are executed to obtain the matching result matrix corresponding to each matching layer. Since each matching layer includes two to-be-matched matrices and each matching layer is corresponding to one matching result matrix; since the size of the two-to-be-matched matrices in each matching layer may vary, the size of the matching result matrix corresponding each matching layer may vary as well; for example, when two to-be-matched two-dimensional matrices each have a size of H rows and W columns, and the number of rows of the first queue is set to be 2s+1, their corresponding matching result matrix has a size of H−2s rows and W−2s columns.

Figure 2:
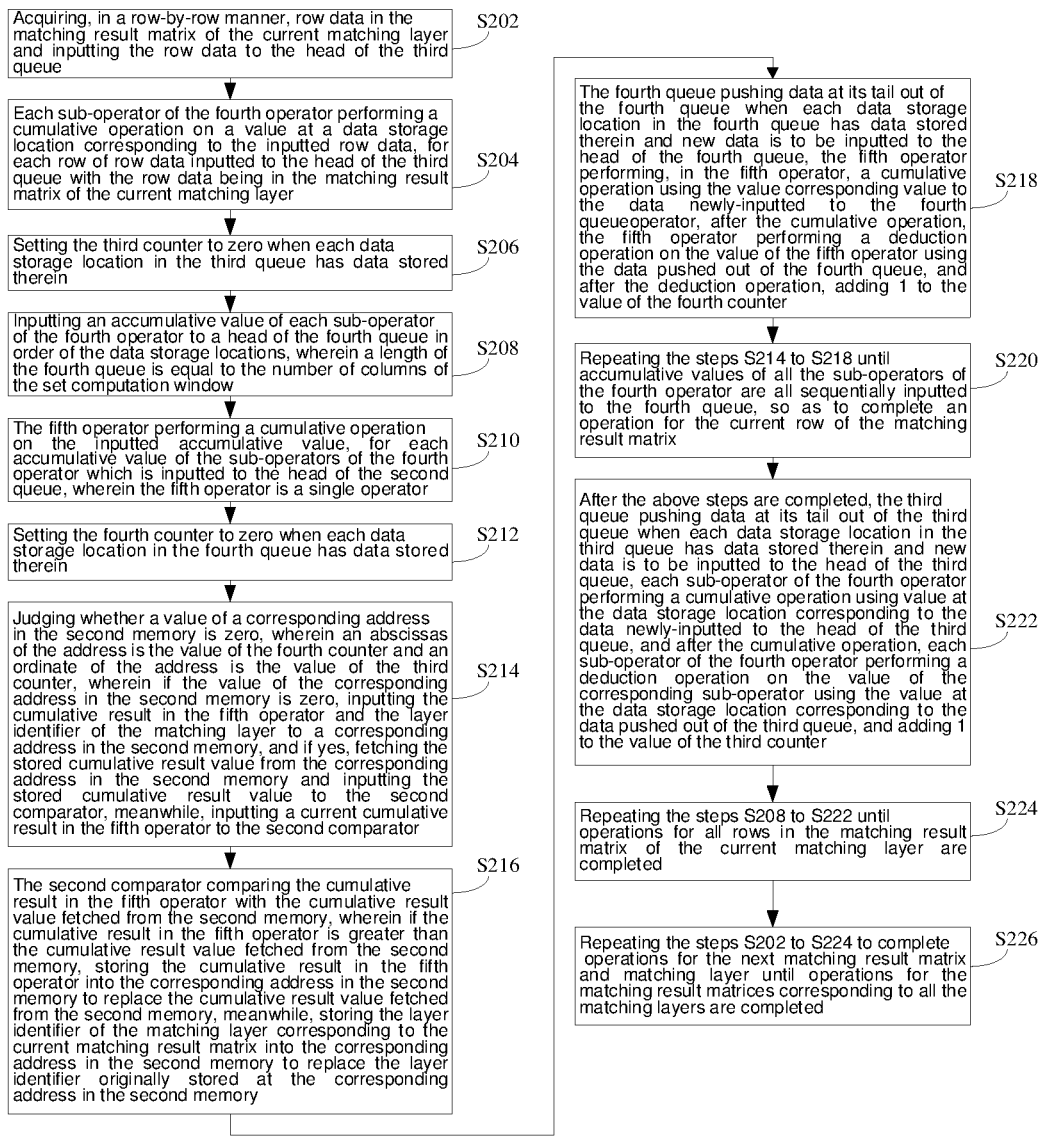
FIG. 2 is a flowchart illustrating operations performed on matching results corresponding to each matching layer in a two-dimensional data matching method according to an embodiment of the present disclosure.
Figure 6:
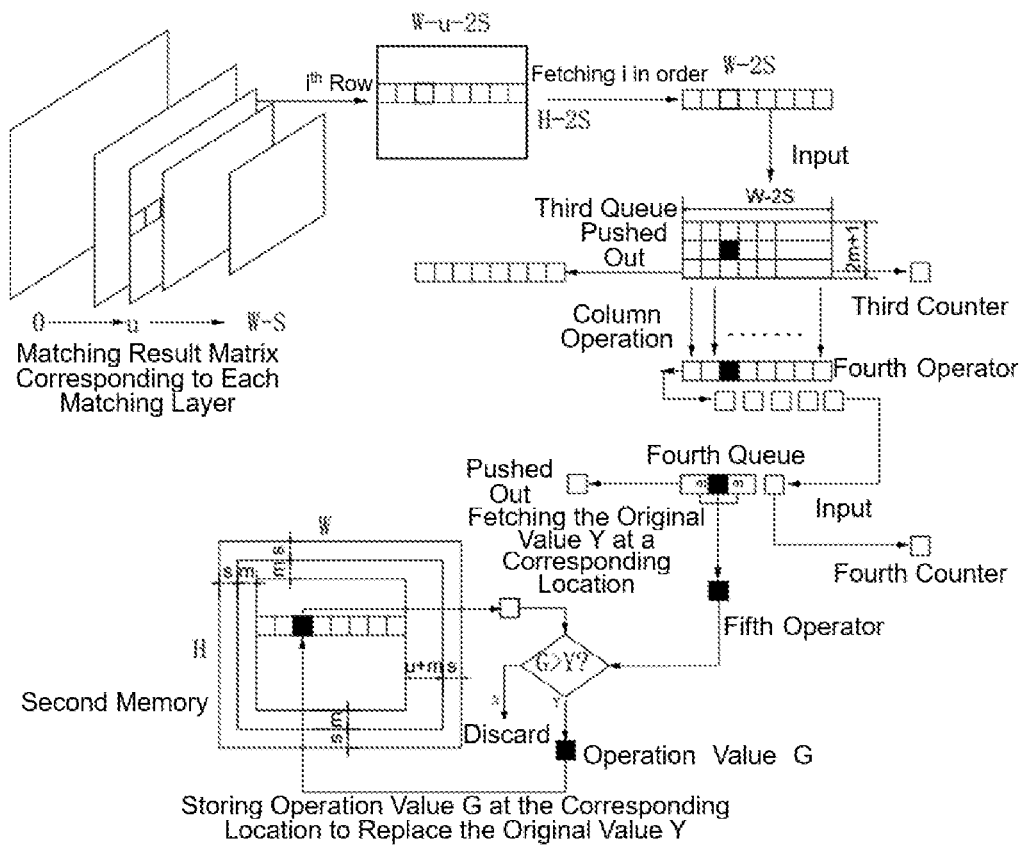
FIG. 6 is a schematic diagram of an operation flow of denoising a matching result matrix according to an embodiment of the present disclosure.

Step 6: the second controller acquiring, in a one-by-one manner, the respective to-be-matched matrix a and to-be-matched matrix b corresponding to each matching layer to perform a matching operation, then obtaining a matching result matrix and a layer identifier of the matching layer;

Step 7: the second controller setting initial values of all the corresponding addresses in the second memory to zero;

Referring to FIG. 2, it illustrates a two-dimensional data matching method, and referring to FIG. 6, it is a schematic diagram of an operation flow of denoising a matching result matrix, which is a flowchart illustrating operations performed on matching result matrix corresponding to each matching layer. An object of the operation is: for same regions in the first matrix and the second matrix and on different matching layers, calculating and comparing a matching effect of each matching layer according to the matching result matrix of each matching layer within the range of a rectangular computation window having a certain number of rows and columns in the corresponding regions of data storage locations, eliminating ambiguities of the matching, and storing the matching data of a layer corresponding to the optimal overlapping regions so as to give a final matching result.

In FIG. 6, as an example, the size of the computation window is set to be (2m+1)×(2m+1) and the layer identifier is u. Different computation windows may be set for different matching layers, and the computation window may also vary in a linear or non-linear manner according to formulas.

An operation is performed on each matching result matrix in order of generation of the respective matching layer, which operation includes the following steps:

S202: acquiring, in a row-by-row manner, row data in the matching result matrix of the current matching layer and inputting the row data to the head of the third queue, wherein elements in the third queue are row data in the matching result matrix, the number of data storage locations of the elements in the third queue is greater than or equal to the number of columns of the largest matching result matrix among all the matching result matrices, and a length of the third queue is the number of rows of the set computation window;

S204: each sub-operator of the fourth operator performing a cumulative operation on a value at a data storage location corresponding to the inputted row data, for each row of row data inputted to the head of the third queue with the row data being in the matching result matrix of the current matching layer, wherein the fourth operator includes a sequence of sub-operators, the number of the sub-operators is equal to the number of data storage locations of the elements in the third queue, and the location of each sub-operator is corresponding to the data storage location of the respective element in the third queue;

S206: setting the third counter to zero when each data storage location in the third queue has data stored therein;

The value of each sub-operator of the fourth operator is an accumulative value of the data storage location of the respective element in the vertical direction of the third queue, and the values are corresponding to accumulative values of (2m+1) columns of the computation window in the column direction;

S208: inputting an accumulative value of each sub-operator of the fourth operator to a head of the fourth queue in order of the data storage locations, wherein a length of the fourth queue is equal to the number of columns of the set computation window;

S210: the fifth operator performing a cumulative operation on the inputted accumulative value, for each accumulative value of the sub-operators of the fourth operator which is inputted to the head of the second queue, wherein the fifth operator is a single operator;

S212: setting the fourth counter to zero when each data storage location in the fourth queue has data stored therein;

The value of the fifth operator is an accumulative value of the accumulative values of the sub-operators of the fourth operator in the direction of the data storage locations of the elements of the third queue. This value is corresponding to an accumulative value of the accumulative values of $(2m+1)$ rows and $(2m+1)$ columns in the row direction of the computation window, that is to say, this value is the total accumulative value of data at all the data storage locations in the matching window having a size of $(2m+1) \times (2m+1)$. This value also represents a correlation degree between a data point at the center of the computation window in the matching result matrix of layer u and data within a scope of $(2m+1) \times (2m+1)$ around this data point. In general, the larger the value is, the higher the correlation degree between the data point and its neighboring points.

S214: judging whether a value of a corresponding address in the second memory is zero, wherein an abscissas of the address is the value of the fourth counter and an ordinate of the address is the value of the third counter, wherein if the value of the corresponding address in the second memory is zero, inputting the cumulative result in the fifth operator and the layer identifier of the matching layer to a corresponding address in the second memory, and if the value of the corresponding address in the second memory is not zero, fetching the stored cumulative result value from the corresponding address in the second memory and inputting the stored cumulative result value to the second comparator, meanwhile, inputting a current cumulative result in the fifth operator to the second comparator;

S216: the second comparator comparing the cumulative result in the fifth operator with the cumulative result value fetched from the second memory, wherein if the cumulative result in the fifth operator is greater than the cumulative result value fetched from the second memory, storing the cumulative result in the fifth operator into the corresponding address in the second memory to replace the cumulative result value fetched from the second memory, meanwhile, storing the layer identifier of the matching layer corresponding to the current matching result matrix into the corresponding address in the second memory to replace the layer identifier originally stored at the corresponding address in the second memory;

comparing the current accumulative value in the fifth operator with an accumulative value of another matching layer at the respective location, means comparing the number of neighboring data points in the matching layers corresponding to the two accumulative values, thereby judging a correlation degree between the value at this location and its neighboring data, and keeping the larger value, i.e., keeping the larger correlation degree, and removing the value with the smaller correlation degree, so as to achieve an object of denoising.

S218: the fourth queue pushing data at its tail out of the fourth queue when each data storage location in the fourth queue has data stored therein and new data is to be inputted to the head of the fourth queue, the fifth operator performing, in the fifth operator, a cumulative operation using the value corresponding to the data newly-inputted to the fourth queue, after the cumulative operation, the fifth operator performing a deduction operation on the value of the fifth operator using the data pushed out of the fourth queue, and after the deduction operation, adding 1 to the value of the fourth counter; that is to say, S218 is the operation advancing by one step in the column direction.

S220: repeating the steps S214 to S218 until accumulative values of all the sub-operators of the fourth operator are all sequentially inputted to the fourth queue, so as to complete an operation for the current row of the matching result matrix;

S222: after the above steps are completed, the third queue pushing data at its tail out of the third queue when each data storage location in the third queue has data stored therein and new data is to be inputted to the head of the third queue, each sub-operator of the fourth operator performing a cumulative operation using value at the data storage location corresponding to the data newly-inputted to the head of the third queue, and after the cumulative operation, each sub-operator of the fourth operator performing a deduction operation on the value of the corresponding sub-operator using the value at the data storage location corresponding to the data pushed out of the third queue, and adding 1 to the value of the third counter; that is to say, S222 is the operation advancing by one step in the row direction.

S224: repeating the steps S208 to S222 until operations for all rows in the matching result matrix of the current matching layer are completed;

S226: repeating the steps S202 to S224 to complete operations for the next matching result matrix and matching layer until operations for the matching result matrices corresponding to all the matching layers are completed; wherein the second memory is configured to store a final matching result matrix, and each address in the final matching result matrix stores the data of largest cumulative result value and the layer identifier corresponding to the largest cumulative result value which are obtained after comparing cumulative results of all the matching layers at the corresponding address, until operations for the matching result matrices corresponding to all the matching layers are completed.

In the two-dimensional data matching method according to the embodiment of the present disclosure, which method is executed by the first controller, the operators, the first queue, the second queue, the first comparator and the first memory which are sequentially connected, as well as by the second controller, the third queue, the fourth queue, the second comparator and the second memory which are sequentially connected; a plurality matching layers of each of the first matrix and the second matrix are first acquired, and matching operations are performed on the data in the matching layers, then the matching result matrices corresponding to the plurality of matching layers are compared and screened to obtain the optimal matching layers of different regions. When data blocks in two-dimensional data are to be matched in such way, it is feasible that operations are performed only on varying data portions between adjacent data blocks, while no operation is performed on overlapped data portions, thus reducing a large amount of repetitive operations, which greatly lowers the operation burdens of the data matching, and increases the operation efficiency of the data matching. Meanwhile, due to use of such queue mode for storing intermediate process data, the storage space can be economized to a great extent, which facilitates data access operations and greatly improves the operation speed.

Embodiment 3

Corresponding to Embodiment 1 and Embodiment 2 above, an embodiment of the present disclosure provides a two-dimensional image matching method. The image is acquired by a binocular camera, when two two-dimensional images are to be matched, in general, depth data of corresponding images needs to be calculated based on the two images to make a description on the three dimensional state of a viewed object.

The two-dimensional image matching method will be described in detail below.

Figures 3, 4:
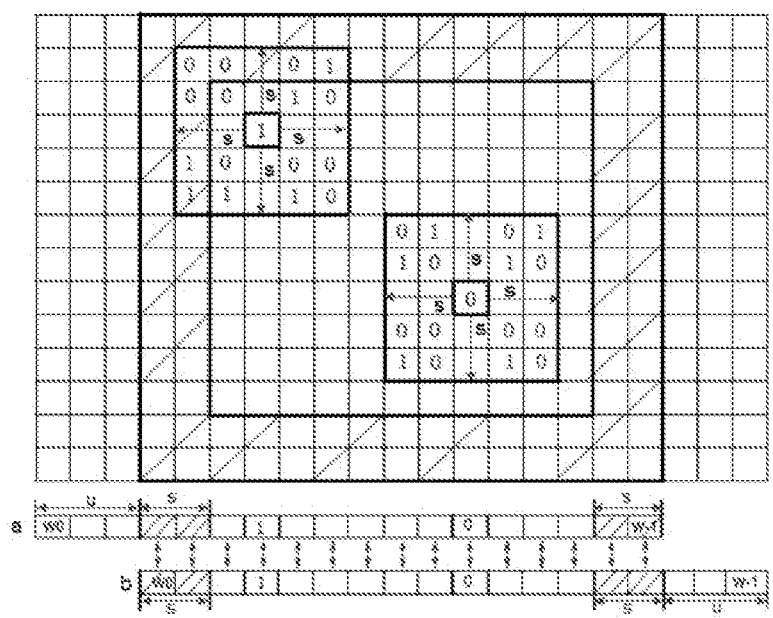
FIG. 3 is a schematic structural diagram of a first matrix and a second matrix according to an embodiment of the present disclosure.
FIG. 4 is a schematic structural diagram of a matching layer according to an embodiment of the present disclosure.

First, two two-dimensional data matrices having exactly the same size are provided. Referring to FIG. 3, which is a schematic structural diagram of a first matrix and a second matrix, the first matrix and the second matrix each have a size of W*H, for sake of brevity of the description, an example in which the first matrix and the second matrix have the same size is taken, and in actual implementation, the size relation between the first matrix and the second matrix is not specifically limited. The data points in each matrix may be set to be Boolean values, and depending on the range or magnitude of the data values, the data points may be set to be 8-bit, 16-bit, 32-bit, or 64-bit values, or other values that can be used for operations; in general, if the above matrices are gray-scale images, the data size of the image is 8 bits, representing different image gray scales between 0 and 255. If each gray-scale image is binarized to obtain a binary image, its values can be changed into a Boolean matrix containing only 0 and 1 values. The use of Boolean matrix can greatly economize data storage space and improve speed and efficiency of data transmission. In the present embodiment, matrices formed by Boolean values are taken as an example. It can be understood that the two-dimensional image matching method provided in this embodiment is also applicable to matrices formed by other types of values.

Referring to FIG. 4, which is a schematic structural diagram of a matching layer, in order to search two matrices, i.e., a first matrix A and a second matrix B, for matching blocks (data blocks) having a certain common feature and a size of (2s+1)×(2s+1), firstly the size of the matching blocks participating in the matching operations is set to be (2s+1)×(2s+1).

To judge a local similarity between images is to calculating a similarity measurement index of the images, which is also referred to as image matching. The image matching may be based on gray-scale images or binary images, and there are various algorithms for the similarity measurement, for example, correlation coefficient, sum of difference squares, sum of absolute difference, least squares, distance function, cost function, etc.

In the method provided in the embodiment of the present disclosure, an adopted algorithm applicable to operations for two matching blocks is to perform operations on pixels at corresponding locations in a one-to-one correspondence manner, and to calculate a final value by summation or other cumulative method, for example, algorithms using, for example, gray scale difference between to image regions, binary image difference, correlation coefficient, sum of difference squares, sum of absolute difference, least square, etc.

In the present embodiment, corresponding pixels of the binary images are directly used to calculate a logical AND, and then the whole matching region is counted, and the number of true values (Boolean value being 1) is calculated, and the number is compared with a threshold or other calculated values to judge the similarity measurement indexes of the two regions. In other algorithms listed above, the calculation can be achieved based on this method using other operators and accumulators, and the operation methods, principles and path thereof are exactly the same, for example, in other methods, such as synthesis algorithms based on multiple algorithms, an operation result obtained from the synthesis operations corresponding to the two images may be compared with other values obtained by synthesis operations. In general, most operational algorithms can be converted to addition to perform the operation, as long as the operation is an addition, and the pixels are relatively independent from each other during the operation, the operation can be achieved and implemented using the method provided in the embodiment of the present disclosure.

The operation steps of the two-dimensional image matching method provided in the embodiment of the present disclosure are as follows:

1. Determining two matrices, i.e., a first matrix A and a second matrix B (also referred to as image A and image B in the present embodiment) to perform operations for matching two-dimensional data, wherein the first matrix A and the second matrix B are each formed by image data;

in order to search the first matrix A and the second matrix B for matching blocks having a certain common feature and a size of (2s+1)×(2s+1), a path and direction for the search are firstly required to be determined, taking the application of image matching as an example:

For a binocular parallel camera, a matching point on another image which is corresponding a feature point in one image is located on a straight line which passes the feature point and is parallel to a connection line joining the focuses of the two cameras. That is to say, the corresponding matching points in image A and image B have the same ordinates, which are all located on a vertical coordinate line corresponding to the respective two sets of data, the direction and path of the matching operation is horizontal, which may be referred to as a horizontal matching or lateral matching; similarly, when the two cameras are vertically aligned and their imaging surfaces are on the same plane, the direction and path of the matching operation is vertical, which matching may be referred to as a vertical matching or perpendicular matching.

For a matching with a binocular oblique camera, a feature point in one image, a corresponding matching point in another image and a viewpoint on a viewed object together form a plane, wherein intersection lines between the plane and image planes of the two images are referred to as polar lines, for a feature point in one image, its corresponding matching point on another image is on a polar line. When the two cameras are arranged to have an angle formed therebetween, there is usually an angle between each polar line and the horizontal line of the image. When spatial position of the viewed object varies, the angle between the polar lines and the horizontal line varies as well, and the direction and path of the matching operation is the direction of the polar lines, which matching may be referred to as oblique matching or oblique line matching. For a matching with a binocular oblique camera, when a spatial distribution of the viewed object cannot be determined, the angles between the horizontal line and the polar lines corresponding to a set matching points has an uncertain variation range. In order to realize an automatic matching, when one feature point in an image is selected, finding the respective matching point on the other image requires a full image search and a full image traversal operation needs to be performed, which matching is also referred to as full image (full array) matching.

The horizontal matching, vertical matching, and oblique matching may be defined as one-dimensional linear matching, and full image (full array) matching may be defined as two-dimensional planar matching. In the embodiment of the present disclosure, matchings on one dimension are first described, in a planar matching, after the one-dimensional operations are completed, a shifting in the vertical direction on one dimension is performed, then one-dimensional operations are carried out, and the shifting and the one-dimensional operation are carried out successively until the operations for the whole image (full array) is completed. A horizontal matching is taken as an example of one-dimensional linear matching, the principles and methods of other vertical matchings and oblique matchings remain unchanged.

2. Layer-by-layer operation of one-dimensional linear matching;

As shown in FIG. 4, FIG. 4 illustrates an overlapping state of the first matrix A and the second matrix B in the horizontal direction. The size of the data blocks participating in the matching operation which are able to represent the image or data features of the center point is set to be $(2s+1)\times(2s+1)$. In FIG. 4, the distance between each data center and the periphery of the respective data block is s. FIG. 4, u represents a layer number of the respective horizontal matching layer, which can also be considered as a horizontal matching coordinate. When u=0, the two matrices are entirely and correspondingly overlapped to perform the matching operation, here the matching is defined as a layer 0 matching. When u=u, an overlapping region corresponding to the matrix A and the matrix B is as shown in the outermost bold black box in FIG. 4, the height of the overlapping region remains unchanged, the length of the overlapping region becomes W−u, and the matching operation is only performed in the overlapping region, and here the matching is defined as a layer u matching. It can be understood that in the above Embodiment 1 or Embodiment 2, W=W−u;

Due to the arrangement of data blocks, the matching result matrix should be within an effective matching region, wherein the effective matching region is obtained by removing a periphery having a width of s from the overlapping region, which is as shown in the bold black box inside the overlapping region in FIG. 4. With the u increasing, the effective matching region of each layer is gradually reduced, when u=W−2s−1, the smallest matching layer is reached, and after matching of this layer is finished, the matching operation is finished. Therefore, the horizontal matching operation requires performing matching operations on W−2s layers.

Corresponding to each layer u, the matching result matrix of the layer has a size of $(W-u-2s)\times(H-2s)$, an overlapping position for matching between the matching result matrix of the layer and the left side of the second matrix b remains unchanged, and an overlapping position for matching between the matching result matrix of the layer and the right side of the first matrix a remains unchanged. Each time the u is increased by 1, a column is removed from the right side of the second matrix b, and a column is removed from the left side of the first matrix a. For the final matching result, one pixel in the image is corresponding to only one final matching result, that is to say, the results of the matching operation have uniqueness, therefore a final matching result matrix needs to be defined. For sake of convenience of calculation, the variables and subscripts of the matching result matrix of each layer and those of the final matching result matrix have a one-to-one corresponding matching relation with the second matrix B, that is, the row coordinates and the column coordinates of the matching result matrix of each layer or the final matching result matrix are determined by the matching relation with the second matrix B. The matching result matrix in Embodiment 1 or Embodiment 2 is equivalent to the matching result layer of the respective layer.

In a layer-by-layer horizontal matching between two images acquired by a binocular parallel camera, a definite physical meaning can be found, different layer numbers u corresponds to the parallaxes between the matching pixels in the two images, and the magnitude of the parallax u is inversely proportional to the distance between the cameras and the viewpoint on the viewed object, the smaller the parallax u, the larger the distance. By substituting into the calculation formula the coordinates of sets of matching points of different layers on which the matching can be achieved, the vertical distance and spatial coordinates between the cameras and the viewpoint corresponding to the image of the matching points can be directly obtained.

In a layer-by-layer horizontal matching between data of two images acquired by a binocular parallel camera, the imaging center lines of the two cameras are parallel to each other and perpendicular to the image plane. The field of view of each of the two images increases with the increase of a measurement depth. Meanwhile, the overlapping region between the two images also increases with the increase of the depth and when the distance is infinite, the two images may be considered as completely overlapped. During the layer-by-layer operation, in the process of u varying from layer zero to layer W−2s, the overlapping region gradually becomes smaller, that is, an overlapping range between the fields of view of the two cameras becomes smaller with the decrease of the depth value.

In the layer-by-layer horizontal matching between data of two images acquired by a binocular parallel camera, the coordinates of the matching points in the image on the left side are always to the right of the coordinates of the matching points in the image on the right side. For this reason, during matching, the first matrix A on the left side is moved leftward according to the direction as shown in FIG. 4, which may also be considered as the second matrix B on the right being moved rightward.

In the layer-by-layer horizontal matching between data of two images acquired by a binocular parallel camera, the so-called layer-by-layer horizontal matching operation is to search for corresponding matching points and viewpoints on the viewed object at different depths. Such operation results in an expansion and fitting of the two two-dimensional images in a three-dimensional space, which is the physical meaning of the layer-by-layer matching in the method.

For other types of matching operations which are not the layer-by-layer horizontal matching between data of two images acquired by a binocular parallel camera, and in which the distribution relation for matching between the left image and the right image is not definite, it is required to perform one more times of matching operation in a direction opposite to the operation direction provided in the embodiment of the present disclosure, that is to say, a complete horizontal matching operation needs to be performed. The first matrix A and the second matrix B are taken as an example for describing the complete horizontal matching operation, the matching method thereof is, assuming that the second matrix B is stationary, the overlapping between the first matrix A and the second matrix B starts from the first column on the right side of the first matrix A, then following a rule that the first matrix A is entirely moved each time by a distance of one column, the matching operation is performed layer by layer. When the first matrix A and the second matrix B are completely overlapped, the movement continues until the first matrix A arrives at a position where first matrix A is completely to the right of the second matrix B and the two matrices are separated.

3. Method and steps of the layer matching operation:

Assuming that two images have an overlapping region therebetween on a certain layer and the overlapping region has a size of (W−u)×H, and after the operation, its matching result matrix has a size of (W−u−2s)×(H−2s), a corresponding relation between the pixel coordinates of the two images is as shown in FIG. 4, and the matching result matrix is equivalent to a rectangle embedded within the overlapping region and having a distance s from each of the four edges of the rectangle. Here, the pixel coordinates of the two images are all in one-to-one correspondence with each other.

An object of the layer matching is to search for data blocks having a similarity feature and a size of (2s+1)×(2s+1) on a matching layer u of image A and image B, wherein the two images have an overlapping region therebetween having a size of (W−u)×H. In the present embodiment, a basic formula and principle for the operation is: in matching blocks having a size of (2s+1)×(2s+1), the pixels at the same locations in the two images are directly subjected to a logical AND operation, then a total number of pixels in the (2s+1)×(2s+1) matching blocks whose results of the logical AND operation is true (or Boolean value being 1) is counted. The total number is compared with a threshold, wherein if the total number is greater than or equal to the threshold, it indicates that the two regions are successfully matched, and a value in the matching result matrix which is corresponding to the center point of the matching blocks is set to be 1, and if the total number is smaller than the threshold, the value is set to be zero.

Referring to FIG. 5, which is a schematic diagram of an operation flow of a layer-by-layer layer matching operation method, wherein the operation flow is corresponding to the operation flow of the two-dimensional data matching method provided in Embodiment 1, and the operation flow includes the following steps:

(1) fetching data of corresponding rows of the two images and performing cumulative operation by rows, and fetching the data of each entire row in order from two to-be-matched matrices corresponding to layer u of image A and image B, then performing cumulative operation in operators, the cumulative operation may be one of or a combination of a plurality of algorithms, including logical AND, logical XOR, addition, subtraction, and multiplication. An operation of logical AND is taken as an example in the present embodiment.

(2) calculating a sum of data storage locations in the vertical direction of 2s+1 rows;

setting a first queue having a size of (W−u)×(2s+1), and inputting the operation result of step (1) to the first queue row by row in a first-in first-out manner. In the first queue, a column accumulator is set for each column, values in the corresponding column locations in the direction of column 2s+1 corresponding to the values of the entire row inputted each time are accumulated in order in the corresponding column accumulators, and when the queue is filled up with 2s+1 columns, the column accumulator completes one operation, and the corresponding value of the accumulators are the accumulative values of all values being 1 in the corresponding 2s+1 columns at the row coordinates corresponding to the column center at this moment, after the operation is completed, the values are fetched and sent to the next procedure of data processing.

After the first time of column cumulative operation is completed and when it is required to perform next step of the column cumulative operation, first the values of the first row at the head of the first queue is subtracted from the current values in the corresponding column accumulators, meanwhile the values of the row at the tail of the first queue is automatically pushed out of the queue, then a new row is inputted to the head of the first queue, and the values at the column locations corresponding to the newly inputted row is added to the corresponding column accumulators, which is equivalent to recalculating a sum of each of the data storage locations in the direction of 2s+1 columns.

(3) calculating a sum of accumulative values of 2s+1 columns in the row direction in the column accumulators;

setting a second queue having a length of 2s+1, fetching the value of each accumulation location in order from the respective column accumulators in a first-in first-out manner, inputting the values to the second queue, setting a row accumulator, the values inputted each time are accumulated in order, when the second queue is filled up with 2s+1 values, the row accumulator completes one operation, the coordinate of the corresponding operation value is the coordinate of the value corresponding to the column center at this moment, and the value is corresponding to an accumulative value of 2s+1 column accumulators in the row direction, and the accumulative value is the matching value for the centers of the matching blocks having the size of (2s+1)×(2s+1) at the coordinate location of this accumulative value, and the accumulative value is also a total number of all the values 1 obtained from logical AND operations in which corresponding data of image A and image B in the regions of the matching blocks having the size of (2s+1)×(2s+1) are entirely overlapped, and the accumulative value represents a degree of similarity between the regions of the matching blocks in the two images. After the operation is completed, the value is fetched and sent to the next procedure of data processing.

After one row cumulative operation is completed and when it is required to perform the next step the row cumulative operation, first the value at the tail of the second queue is subtracted from the current values in the corresponding row accumulators, meanwhile the value at the tail of the second queue is automatically pushed out of the second queue, then a new value of column accumulator is inputted to the head of the second queue, and the newly-inputted value of column accumulator is added to the row accumulators, which is equivalent to the row accumulator calculating a sum of values of 2s+1 column accumulators.

(4) storing the result into the matching result matrix

The accumulative value Z obtained from step (3) is stored into a corresponding data storage location in the matching result matrix, and during the storage, the accumulative value is compared with a matching threshold Q, wherein if the accumulative value Z is greater than or equal to the matching threshold Q, the value at the corresponding data storage location is set to be 1, if the accumulative value Z is smaller the matching threshold Q, the value at the corresponding data storage location is set to be 0. The operation for the corresponding locations takes column coordinates of 2s+1 pieces of center data in the row accumulators as the column coordinates of the data, and takes the row coordinates of center data of 2s+1 data rows in the row accumulators as the row coordinates of the data.

For a operation region having an overlapping region with a size of (W−u)×H, the corresponding matching result matrix has a size of (W−u−2s)×(H−2s). After completion of each time of operation, the final results are stored in corresponding locations in the matching result matrix according to the above row coordinates and column coordinates.

The above steps are repeated until operations for the entire overlapping region is completed.

4. Writing result of the layer-by-layer operation of one-dimensional linear matching into a one-dimensional linear matching result matrix;

For the final matching result, data in one matrix should only have one final matching result at most, that is to say, the results of the matching operation have uniqueness, thus one point in the matrix should not be corresponding to a plurality of points in the other matrix. Since the matching and operations are performed layer by layer, in the matching operation for each layer, data in two matrices are in one-to-one correspondence with each other on this layer. However, if the layer matching results of multiple layers of matching are synthesized, due to the adoption of similarity judgment criteria that the matching result being greater than or equal to the matching threshold, a feature point in one matrix will have corresponding matching results among results of different matching layers, which results in a phenomenon of one-to-multiple and multiple-to-multiple correspondence between the two images.

A process of writing the result of the layer-by-layer matching operation into the matching result matrix on the respective dimension is that, for matching result matrices of different layers on a matching dimension, taking one pixel in an image as a basis, counting matching status of this point on different layers, then performing comparative operations on matching result matrices of different layers, retaining the matching result with the largest possibility of matching and removing other matchings of ambiguity, so as to achieve the uniqueness of the matching results, this process is also referred to as denoising and the algorithm of this step is also referred to as a denoising algorithm.

A denoising algorithm means counting, in the matching result matrix corresponding to each matching layer, a total number of matched points in a data block having a size of $(2m+1)\times(2m+1)$ centered around a matching point, and a large number of matching points represents that points close to this matching point also meets the conditions for matching, which also represents a spatial continuity feature of the image data, then denoising can be performed based on the continuity feature. In general, the value range of (2m+1) is no greater than the number of rows or the number of columns of the matching result matrix, and preferably, the value of m may be any natural number between 1 and 20.

Referring to FIG. 6, which is a schematic diagram of an operation flow of denoising a matching result matrix, wherein the operation flow is corresponding to the operation flow performed on the matching result matrix corresponding to each matching layer in the two-dimensional data matching method provided in Embodiment 2, and the operation flow includes the following steps:

(1) fetching row data in the matching result matrix of the current matching layer by rows;

(2) calculating a sum of each data storage locations in the vertical direction of 2m+1 rows;

setting a third queue having a size of (W−2s)×(2m+1), and inputting the fetched row data to the third queue by rows in a first-in first-out manner. In the third queue, each column is provided with a column accumulator, wherein each column accumulator is corresponding to a column coordinate, with the value of u being gradually increased, the matching result matrix is gradually reduced, which has a width of (W−2s−u), while the variables and the subscript of the column coordinates thereof always have a one-to-one correspondence matching relation with those of the image B, that is to say, the column locations are aligned to the right and reduced layer by layer.

Values at the corresponding column locations in the direction of 2m+1 columns corresponding to the values of the entire row inputted each time are accumulated in order in the corresponding column accumulators, and when the queue is filled up with 2m+1 columns, the column accumulators complete one operation, and the corresponding values of the accumulators are the accumulative values of all values being 1 in the corresponding 2m+1 columns at the row coordinate corresponding to the row center at this moment, after the operation is completed, the values are fetched and sent to the next procedure of data processing.

After the column cumulative operation is completed and when it is required to perform the next step of the column cumulative operation, first the values of the row at the tail of the third queue which are at the corresponding column locations of the row are subtracted from the current values in the corresponding column accumulators, meanwhile a new row is inputted to the head of the queue, then the values of the row at the tail of the queue is automatically pushed out of the queue, and the value at the column locations corresponding to the newly inputted row is added to the corresponding column accumulator, which is equivalent to recalculating a sum of all the data storage locations in the direction of column 2s+1.

(3) calculating a sum of accumulative values of 2m+1 columns in the row direction in the column accumulators;

setting a fourth queue having a length of 2m+1, fetching the value of each accumulation location in order from the column accumulator in a first-in first-out manner, inputting the value to the fourth queue, setting a row accumulator, the values inputted each time are accumulated in order, when the fourth queue is filled up with 2m+1 values, the row accumulator completes one operation, the coordinate of the corresponding operation value is the coordinate of the value corresponding to the center of the fourth column at this moment, and the value is corresponding to an accumulative value of 2m+1 column accumulators in the row direction, and the accumulative value is the number of points matched in a (2m+1)×(2m+1) data block located at the coordinate of this value, and the magnitude of the value represents whether a good spatial continuity can be found among the matched points. After the operation is completed, the value is fetched and sent to the next procedure of data processing.

After the cumulative operation for one row is completed, and the cumulative operation of rows for the next step is to be performed, first the value at the tail of the fourth queue is subtracted from the current value in the row accumulator, meanwhile a new value of column accumulator is inputted to the head of the fourth queue, the value at the tail of the fourth queue is automatically pushed out of the queue, and the newly-inputted value of the column accumulator is added to the row accumulator, which is equivalent to the row accumulator calculating a sum of values of 2m+1 column accumulators.

(4) storing the result into the final matching result matrix storing the accumulative value G, which is obtained from each time of operation performed by the row accumulator in step (3), into a corresponding location in the final matching result matrix, during the storage, an initial value Y at the corresponding location in the final matching result matrix is fetched and then compared with the accumulative value G of this time, wherein if the accumulative value G of this time is greater than or equal to the initial value Y, the accumulative value G is stored at the corresponding location in the final matching result matrix to replace the initial value Y, if the accumulative value G of this time is smaller than the initial value Y, the original initial value Y at the corresponding location remains unchanged.

At the same time of storing the value of this time of operation, it is required to provide another matrix which is completely identical to the final matching result matrix, and this new matrix should record the data of the corresponding layer u, wherein the data represents a parallax between the matching points. Evidently, it is also feasible to provide a three-dimensional result matrix directly, which stores values of the operations as well as values of each layer. The operation for the corresponding locations is as shown in FIG. 5, in which column coordinates of 2m+1 pieces of center data in the row accumulator are taken as the column coordinates of the data, and the row coordinates of center data of 2m+1 rows are taken as the row coordinates of the data.

The data structure of each original image is a two-dimensional data structure having a size of W×H, after the layer matching operations, the matching result matrix for each layer is a two-dimensional data structure having a size of (W−u−2s)×(H−2s), and after the denoising operation, the resultant final matching result matrix has a size of (W−2s−2m)×(H−2s−2m). As shown in FIG. 5 and FIG. 6, in the processes of all the above operations, coordinates of the corresponding matching pixels, matching points and matching result matrix are all calculated with the row coordinates and column coordinates of image b being used as the basis of the calculation.

The above steps are repeated until denoising operations for matching results of all layers are completed.

The completed matching result matrix represents the coordinates of data points that are corresponding to the pixels of image B and can be finally matched with image A after matchings are performed on the image A and the image B acquired by a binocular parallel camera, and parallax value u corresponding to two matching points among the matching points of the image A. The spatial coordinates of the viewpoint can be obtained according to the value of u and calculation formulas relating to the binocular matching.

5. Method and steps for two-dimensional planar matching

For a two-dimensional planar matching, it is required to firstly perform horizontal linear matchings, wherein the method and steps for matching each horizontal line are the same as those described in steps 2, 3, 4. When matching of one line is completed, a matching result matrix corresponding to the line is obtained, then, one of the data matrices is used as the basis, and the other matrix is to be entirely shifted down by one row in the vertical direction, then the overlapping region between the two data matrices are to be completely matched again in a downward horizontal dimension, in this way, matchings on all horizontal dimensions are completed in order. After the matchings are all completed, the matching result matrices on all the dimension are written into the final matching result matrix according to the method of step 4, and the largest matching value of corresponding pixels in the original image are retained, thus the complete matching of the two-dimensional plane is achieved.

A processing device can be formed based on the methods provided in the present disclosure, which is configured to automatically achieve data processing and operations, the device may be realized in form of software, it is also feasible to embody the algorithms into dedicated hardware chips and to use digital circuits to process the data. The method is based on basic operations, and if the algorithms are transplanted to dedicated chips for massively parallel processing, such as GPU (Graphic Processing Units), NPU (Network Processing Unit), and FPGA (Field Programmable Gate Array) for operations, thus extra acceleration performances provided by these types of chips can be obtained. Dedicated operational (computing) chips can also be developed according to this method. Use of this method will greatly improve the operation speed and efficiency, save the data storage space, improve the data access speed, reduce the consumption of operation resources, and after comparison, the efficiency is improved by 60 times or even more over the conventional methods.

Embodiment 4

Figure 7:
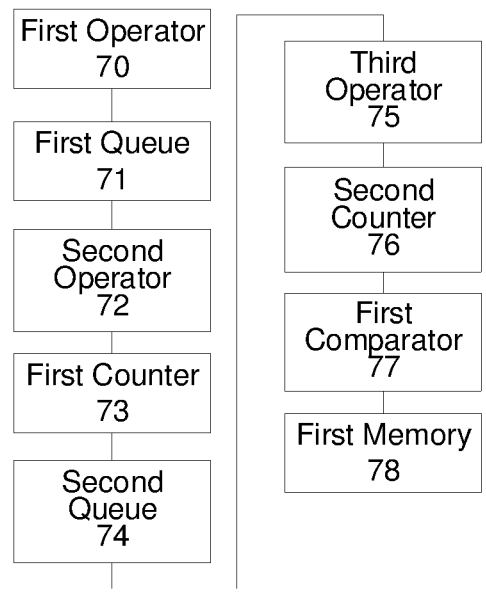
FIG. 7 is a schematic structural diagram of a first two-dimensional data matching device according to an embodiment of the present disclosure.

Corresponding to the above method embodiments, referring to FIG. 7, which is a schematic structural diagram of a first two-dimensional data matching device, the device includes a first operator 70, a first queue 71, a second operator 72, a first counter 73, a second queue 74, a third operator 75, a second counter 76, a first comparator 77 and a first memory 78 which are sequentially connected, wherein each of the first queue 71 and the second queue 74 is a data storage structure, and a data storage rule for the first queue 71 and the second queue 74 is first-in first-out;

wherein the first operator 70 is configured to perform, in a row-by-row manner, a bitwise matching operation on data in same data rows in a to-be-matched matrix a and a to-be-matched matrix b; input a matching result of the matching operation to a head of a first queue by rows, wherein elements in the first queue are data obtained after the matching operation, and the number of data storage locations of the elements in the first queue is greater than or equal to the number of columns of each of the to-be-matched matrix a and the to-be-matched matrix b, and a length of the first queue is the number of rows of a set matching window;

the second operator 72 is configured such that each sub-operator of the second operator performs a cumulative operation using a value at a data storage location corresponding to the inputted matching result, for each matching result inputted to the head of the first queue, wherein the second operator includes a sequence of sub-operators, the number of the sub-operators is equal to the number of data storage locations of the elements in the first queue, and the location of each sub-operator is corresponding to the data storage location of the respective element in the first queue;

the first counter 73 is configured to set the first counter to zero when each data storage location in the first queue has data stored therein;

the second operator 72 is further configured to input an accumulative value of each sub-operator of the second operator to a head of the second queue in order of the data storage locations, wherein a length of the second queue is equal to the number of columns of the matching window;

the third operator is 75 configured to perform a cumulative operation on the inputted accumulative value, for each accumulative value of the respective sub-operator of the second operator which is inputted to the head of the second queue, wherein the third operator is a single operator;

the second counter 76 is configured to set the value of the second counter to zero when each data storage location in the second queue has data stored therein;

the third operator 75 is further configured to input the cumulative result in the third operator to the first comparator;

the first comparator 77 is configured to comparing the cumulative result in the third operator with a pre-stored matching threshold, wherein if the cumulative result in the third operator is greater than or equal to the matching threshold, the comparison result is a first value, if the cumulative result in the third operator is smaller than the matching threshold, the comparison result is a second value, wherein the first value denotes that the comparison result is true, or 1, and the second value denotes that the comparison result is false, or 0; and the first comparator is configured to input the comparison result to a first memory to form a matching result matrix, wherein abscissas of the matching result matrix in the first memory are values of the second counter, and the ordinates of the matching result matrix are values of the first counter.

the second queue 74 is configured to push data at its tail out of the second queue when each data storage location of the second queue has data stored therein and new data is to be inputted to the head of the second queue.

the third operator 75 is configured to perform, in the third operator, a cumulative operation using value of the respective sub-operator of the second operator corresponding to the newly-inputted data, the third operator is configured to perform a deduction operation on the value of the third operator using the data pushed out of the tail of the second queue after the cumulative operation, and to add 1 to the value of the second counter after the deduction operation.

the second operator 72 is configured such that operation values in all the sub-operators of the second operator are all sequentially inputted into the second queue after repeated running of the third operator, the first comparator, the second queue and the third operator, so as to achieve a complete matching between the current data row in the to-be-matched matrix a and the current data row in the to-be-matched matrix b;

the first queue 71 is configured to push data at its tail out of the first queue when each data storage location of the first queue has data stored therein and new data is to be inputted to the head of the first queue again; and the second operator 72 is configured such that each sub-operator of the second operator performs the cumulative operation using the value at the data storage location corresponding to the data newly-inputted to the head of the first queue, and each sub-operator of the second operator is configured to perform the deduction operation on the value of the corresponding sub-operator using the value at the data storage location corresponding to the data pushed out of the first queue after the cumulative operation, and to add 1 to the first counter; and after repeated running of the second operator, the third operator, the second counter, the third operator, the first comparator, the second queue, the third operator, the second operator and the first queue, all matching operations for all the data rows in the to-be-matched matrix a and the to-be-matched matrix b are completed.

The embodiment of the present disclosure provides a two-dimensional data matching device, including a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out. The first operator performs, in a row-by-row manner, a bitwise matching operation on data in the same data rows in a to-be-matched matrix a and a to-be-matched matrix b and inputs a matching result to the first queue. Each sub-operator of the second operator performs a cumulative operation using a value at a data storage location corresponding to the inputted matching result. The third operator performs a cumulative operation on the accumulative values inputted to the second queue. The first comparator compares the cumulative result in the third operator with a pre-stored matching threshold and inputs the comparison result to the first memory to form a matching result matrix. The above steps are repeated until operation values of all the sub-operators of the second operator are all sequentially inputted to the second queue, and a complete matching between all data rows of the to-be-matched matrix a and the to-be-matched matrix b is achieved. When data blocks in two-dimensional data are to be matched in such way, it is feasible that operations are performed only on varying data portions between adjacent data blocks, while no operation is performed on overlapped data portions, thus reducing a large amount of repetitive operations, which greatly lowers the operation burdens of the data matching, and increases the operation efficiency of the data matching. Meanwhile, due to use of such queue mode for storing as intermediate process data, the storage space can be economized to a great extent, which facilitates data access operations and greatly improves the operation speed.

Figure 8:
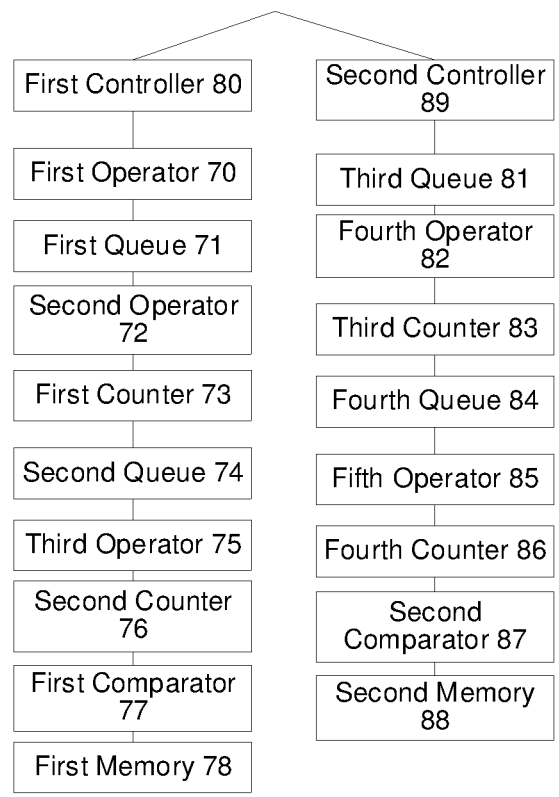
FIG. 8 is a schematic structural diagram of a second two-dimensional data matching device according to an embodiment of the present disclosure.

Referring to FIG. 8 which is a flowchart of a second two-dimensional data matching device, the device includes a first operator 70, a first queue 71, a second operator 72, a first counter 73, a second queue 74, a third operator 75, a second counter 76, a first comparator 77, a first memory 78, which are sequentially connected and the device further includes a first controller 80 connected with the first operator 70;

the first controller 80 is configured to acquire, according to a set order, row data at different locations in the to-be-matched matrix a and in the to-be-matched matrix b in order, wherein the location of the row data in the to-be-matched matrix a which is acquired each time is the same as that in the to-be-matched matrix b; input the row data acquired each time to the first operator, wherein the set order at least includes one of the following: acquiring row by row from top to bottom, acquiring row by row from bottom to top, acquiring column by column from left to right, and acquiring column by column from right to left.

the first controller is further configured to generate a marching layer, which includes the following steps: acquiring a first matrix and a second matrix; storing the first matrix in a first storage area and storing the second matrix in a second storage area; moving the second matrix according to a set moving path, each time by a set unit matching distance, so as to change an overlapping region between the first matrix and the second matrix, wherein the set moving path includes a linear path or a planar path, the linear path includes one or more of a horizontal linear path, a vertical linear path and an oblique path, and the planar path includes a plurality of linear paths of a same type; generating a matching layer according to an overlapping region produced by each time of movement, wherein the matching layer includes the to-be-matched matrix a, the to-be-matched matrix b and a layer identifier of the matching layer.

The first controller is further configured such that the first matrix and the second matrix are two two-dimensional image data matrices acquired by a binocular parallel camera, wherein each two-dimensional image data matrix includes a binary image matrix or a Boolean matrix.

The first controller is further configured to use row numbers and column numbers of an overlapping region in the first matrix as well as data corresponding to the row numbers and the column numbers, as the to-be-matched matrix a; use row numbers and column numbers of an overlapping region in the second matrix as well as data corresponding to the row numbers and the column numbers, as the to-be-matched matrix b; the first controller is configured to use a movement distance of the second matrix as a layer identifier of the matching layer; and to store the to-be-matched matrix a, the to-be-matched matrix b and the layer identifier as the matching layer.

The above device further includes a second controller 89, a third queue 81, a fourth operator 82, a third counter 83, a fourth queue 84, a fifth operator 85, a fourth counter 86, a second comparator 87 and a second memory 88, wherein each of the third queue 81 and the fourth queue 84 is a data storage structure, and a data storage rule for the third queue and the fourth queue is first-in first-out;

the second controller 89 is configured to acquire, in a one-by-one manner, the respective to-be-matched matrix a and to-be-matched matrix b corresponding to each matching layer to perform a matching operation, then to obtain a matching result matrix and a layer identifier of the matching layer; and the second controller is configured to perform the following operation on the each matching result matrix according to the layer identifier of the respective matching layer: setting initial values of all corresponding addresses in the second memory to zero; acquiring row data in a matching result matrix of the current matching layer in a row-by-row manner and inputting the row data to a head of the third queue, wherein elements in the third queue are row data in the matching result matrix, and the number of data storage locations of the elements in the third queue is greater than or equal to the number of columns of the largest matching result matrix among all the matching result matrices, and the length of the third queue is the number of rows of a set computation window;

the fourth operator 82 is configured such that each sub-operator of the fourth operator performs a cumulative operation using a value at a data storage location corresponding to the inputted row data, for each row of row data inputted to the head of the third queue with the row data being in the matching result matrix of the current matching layer, wherein the fourth operator includes a sequence of sub-operators, the number of the sub-operators is equal to the number of data storage locations of the elements in the third queue, and the location of each sub-operator is corresponding to the data storage location of the respective element in the third queue;

the third counter 83 is configured to set the third counter to zero when each data storage location in the third queue has data stored therein;

the fourth operator 82 is configured to input an accumulative value of each sub-operator of the fourth operator to a head of the fourth queue in order of the data storage locations, wherein a length of the fourth queue is equal to the number of columns of the set computation window;

the fifth operator 85 is configured to perform a cumulative operation on the inputted accumulative value, for each accumulative value of the respective sub-operator of the fourth operator which is inputted to the head of the fourth queue, wherein the fifth operator is a single operator;

the fourth counter 86 is configured to set the fourth counter to zero when each data storage location in the fourth queue has data stored therein;

the second controller 89 is further configured to judge whether a value of a corresponding address in the second memory is zero, wherein an abscissas of the address is the value of the fourth counter and an ordinate of the address is the value of the third counter, wherein if the value of the corresponding address in the second memory is zero, the second controller inputs the cumulative result in the fifth operator and the layer identifier of the matching layer to a corresponding address in the second memory, and if the value of the corresponding address in the second memory is not zero, the second controller fetches the stored cumulative result value from the corresponding address in the second memory and inputs the stored cumulative result value to the second comparator, meanwhile, inputs a current cumulative result in the fifth operator to the second comparator;

the second comparator 87 is configured to compare the cumulative result in the fifth operator with the cumulative result value fetched from the second memory, wherein if the cumulative result in the fifth operator is greater than or equal to the cumulative result value fetched from the second memory, the second comparator stores the cumulative result in the fifth operator into the corresponding address in the second memory to replace the cumulative result value fetched from the second memory, meanwhile, the second comparator stores the layer identifier of the matching layer corresponding to the current matching result matrix into the corresponding address in the second memory to replace the layer identifier originally stored at the corresponding address in the second memory;

the fourth queue 84 is configured to push data at its tail out of the fourth queue when each data storage location in the fourth queue has data stored therein and new data is to be inputted to the head of the fourth queue;

the fifth operator 85 is configured to perform, in the fifth operator, a cumulative operation using the value corresponding to the data newly-inputted to the fourth operator, and to perform, a deduction operation on the value of the fifth operator using the data pushed out of the fourth queue after the cumulative operation, and to add 1 to the value of the fourth counter after the deduction operation;

the fourth operator 82 is configured such that operation values of all the sub-operators of the fourth operator are all sequentially inputted into the fourth queue after repeated running of the second controller, the second comparator, the fourth queue and the fifth operator, so as to achieve operations for the current row in the matching result matrix;

the third queue 84 is configured to push data at its tail out of the third queue when each data storage location in the third queue has data stored therein and new data is to be inputted to the head of the third queue;

the fourth operator 82 is configured such that each sub-operator of the fourth operator performs, in the sub-operator, the cumulative operation using the value at the data storage location corresponding to the data newly-inputted to the head of the third queue, and each sub-operator of the fourth operator is configured to perform the deduction operation on the value of the corresponding sub-operator using the value at the data storage location corresponding to the data pushed out of the third queue after the cumulative operation, and to add 1 to the third counter; and the second controller 89 is configured to repeatedly trigger running of the fourth operator, the fifth operator, the fourth counter, the second controller, the second comparator, the fourth queue, the fifth operator, the fourth operator, the third queue and the fourth operator until matching operations for all the rows in the matching result matrix of the current matching layer are completed; the second controller is further configured to repeatedly trigger running of from the second controller to the fourth operator to achieve the operations for the next matching result matrix and matching layer, until operations for matching result matrices corresponding to all the matching layers are completed, wherein the second memory is configured to store a final matching result matrix, and each address in the final matching result matrix stores the largest cumulative result value and its layer identifier which are obtained after comparing the cumulative results of all the matching layers at the corresponding address.

Embodiment 5

Figure 9:
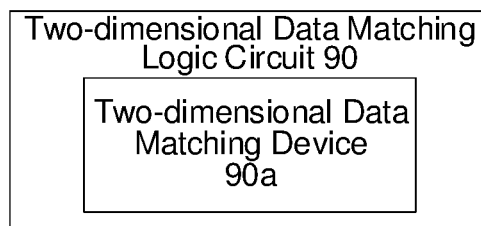
FIG. 9 is a schematic structural diagram of a two-dimensional data matching logic circuit according to an embodiment of the present disclosure.

Corresponding to the above method embodiments and the device embodiment, referring to FIG. 9, which is a schematic structural diagram of a two-dimensional data matching logic circuit, the two-dimensional data matching logic circuit 90 includes the above two-dimensional data matching device 90a.

In the above method embodiments and device embodiments, the first controller, the first operator, the first queue, the second operator, the first counter, the second queue, the third operator, the second counter, the first comparator and the first memory, as well as the second controller, the third queue, the fourth operator, the third counter, the fourth queue, the fifth operator, the fourth counter, the second comparator and the second memory and the like can all be realized by the corresponding logic circuits and chips; wherein the first queue, the second queue, the third queue, the fourth queue, the first memory and the second memory can be realized by high-speed memory chips; the first operator, the second operator, the third operator, the fourth operator or the fifth operator may each be in the form of a summator, a multiplier, an accumulator or the like; and the first controller, the first counter, the second counter, the second controller, the third counter and the fourth counter can all be realized by corresponding circuit structures or chips.

The above two-dimensional data matching logic circuit can be set up and connected by various corresponding digital chips or circuits to realize the above two-dimensional data matching method. It is to be understood that the two-dimensional data matching method can also be realized by programmable logic chips such as FPGA, or by integrating the above two-dimensional data matching logic circuits on a separate chip using a dedicated integrated chip.

The two-dimensional data matching logic circuit has the same technical features, solve the same technical problems and achieve the same technical effects as those of the two-dimensional data matching method and device provided in the foregoing embodiments.

If the functions are embodied in form of software functional units and are sold or used as independent products, they can be stored in computer readable medium. Based on such understanding, the essence of the technical solutions of the present disclosure, or in other words, the part making contributions to the prior art or part of the technical solutions may be embodied in form of a software product, wherein the computer software product is stored in a storage medium and includes multiple instructions which cause a computer device (which may be a personal computer, server, network device or the like) to execute all or part of the steps of the embodiments of the present disclosure. The foregoing storage medium includes various media on which program codes can be stored, such as usb flash drive, removable hard disk, read-only memory (ROM), random access memory (RAM), magnetic disk, and optical disk.

It is to be finally noted that all the above embodiments are merely specific implementations of the present disclosure which are intended to describe the technical solutions of the present disclosure, rather than limiting the same, and the scope of protection of the present disclosure is not limited thereto. Although the present disclosure has been described in detail with reference to the foregoing embodiments, those of ordinary skills in the art should understand that, any one skilled in that art can still make modifications or variations that can be easily come up with, to the technical solution recited in the foregoing embodiments, or make equivalent substitutions on some of the technical features therein, while these modifications, variations or equivalent substitutions does not make the essence of the corresponding technical solutions depart from the spirit and scope of the technical solutions of the embodiments of the present disclosure, thus should all be covered by the scope of protection of the present disclosure. Therefore, the scope of protection of the present disclosure shall be determined by the scope of protection as claimed by the appended claims.

What is claimed is:

1. A two-dimensional data matching method, wherein the method is executed by a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out;

the method comprises following steps:
(1) the first operator performing, in a row-by-row manner, a bitwise matching operation on data in same data rows in a to-be-matched matrix a and a to-be-matched matrix b;
(2) inputting a matching result of the matching operation to a head of a first queue by rows, wherein elements in the first queue are data obtained after the matching operation, and a number of data storage locations of the elements in the first queue is greater than or equal to a number of columns of each of the to-be-matched matrix a and the to-be-matched matrix b, and a length of the first queue is equal to a number of rows of a set matching window;
(3) each sub-operator of the second operator performing a cumulative operation using a value at a data storage location corresponding to the inputted matching result for each matching result inputted to the head of the first queue, wherein the second operator comprises a sequence of sub-operators, the number of the sub-operators is equal to the number of data storage locations of the elements in the first queue, and a location of each sub-operator is corresponding to the data storage location of a respective element in the first queue;
(4) setting the first counter to zero when each data storage location in the first queue has data stored therein;
(5) inputting an accumulative value of each sub-operator of the second operator to a head of the second queue in order of the data storage locations, wherein a length of the second queue is equal to a number of columns of the matching window;
(6) the third operator performing a cumulative operation on the inputted accumulative values, for each accumulative value of a respective sub-operator of the second operator being inputted to the head of the second queue, wherein the third operator is a single operator;
(7) setting a value of the second counter to zero when each data storage location in the second queue has data stored therein;

(8) inputting a cumulative result in the third operator to the first comparator;
(9) the first comparator comparing the cumulative result in the third operator with a pre-stored matching threshold, wherein if the cumulative result in the third operator is greater than or equal to the matching threshold, a comparison result is a first value, if the cumulative result in the third operator is smaller than the matching threshold, the comparison result is a second value, wherein the first value denotes that the comparison result is true, or 1, and the second value denotes that the comparison result is false, or 0;
(10) inputting the comparison result to the first memory to form a matching result matrix, wherein abscissas of the matching result matrix in the first memory are values of the second counter, and ordinates of the matching result matrix are values of the first counter;
(11) the second queue pushing data at its tail out of the second queue when each data storage location of the second queue has data stored therein and new data is to be inputted to the head of the second queue, the third operator performing, in the third operator, a cumulative operation using a newly-inputted value corresponding to a respective sub-operator of the second operator, after the cumulative operation, the third operator performing, a deduction operation on a value of the third operator using the data pushed out of the tail of the second queue, and after the deduction operation, adding 1 to the value of the second counter;
(12) repeating the steps (8), (9), (10) and (11) until operation values in all the sub-operators of the second operator are all sequentially inputted to the second queue, so as to achieve a complete matching between a current data row in the to-be-matched matrix a and a current data row in the to-be-matched matrix b;
(13) after the above steps are completed, the first queue pushing data at its tail out of the first queue when each data storage location in the first queue has data stored therein and new data is to be inputted to the head of the first queue, and each sub-operator of the second operator performing the cumulative operation using a value at a data storage location corresponding to the data newly-inputted to the head of the first queue, and after the cumulative operation, each sub-operator performing the deduction operation on the value of a corresponding sub-operator using the value at the data storage location corresponding to the data pushed out of the tail of the first queue, and adding 1 to the first counter; and
(14) repeating the steps (5), (6), (7), (8), (9), (10), (11), (12) and (13) until matching operations for all the data rows in the to-be-matched matrix a and all the data rows in the to-be-matched matrix b are completed.

2. The method according to claim 1, wherein execution of the method further involves a first controller connected with the first operator;
the method further comprises:
the first controller acquiring, according to a set order, row data at different locations in the to-be-matched matrix a and in the to-be-matched matrix b in order, wherein a location of the row data in the to-be-matched matrix a which is acquired each time is the same as that in the to-be-matched matrix b; inputting the row data acquired each time to the first operator, wherein the set order at least comprises one of the following: acquiring row by row from top to bottom, acquiring row by row from bottom to top, acquiring column by column from left to right, and acquiring column by column from right to left.

3. The method according to claim 2, wherein the method further comprises: the first controller generating a matching layer, which comprises the following steps:
the first controller acquiring a first matrix and a second matrix;
the first controller storing the first matrix into a first storage area and storing a second matrix into a second storage area;
the first controller moving the second matrix according to a set moving path, each time by a set unit matching distance, so as to change an overlapping region between the first matrix and the second matrix, wherein the set moving path comprises a linear path or a planar path, the linear path comprises one or more of a horizontal linear path, a vertical linear path and an oblique path, and the planar path comprises a plurality of linear paths of a same type; and
the first controller generating a matching layer according to an overlapping region produced by each time of movement, wherein the matching layer comprises the to-be-matched matrix a, the to-be-matched matrix b and a layer identifier of the matching layer.

4. The method according to claim 2, wherein the first matrix and the second matrix described above are each a two-dimensional image data matrix acquired by a binocular parallel camera, wherein each two-dimensional image data matrix comprises a binary image matrix or a Boolean matrix.

5. The method according to claim 3, wherein the step of the first controller generating a matching layer according to an overlapping region produced by each time of movement comprises:
the first controller using row numbers and column numbers of an overlapping region in the first matrix as well as data corresponding to the row numbers and the column numbers, as the to-be-matched matrix a;
the first controller using row numbers and column numbers of an overlapping region in the second matrix as well as data corresponding to the row numbers and the column numbers, as the to-be-matched matrix b;
the first controller using a movement distance of the second matrix as a layer identifier of the matching layer; and
the first controller storing the to-be-matched matrix a, the to-be-matched matrix b and the layer identifier as the matching layer.

6. The method according to claim 5, further comprising:
the second controller acquiring, in a one-by-one manner, the respective to-be-matched matrix a and to-be-matched matrix b corresponding to each matching layer to perform a matching operation, then obtaining a matching result matrix and a layer identifier of the matching layer;
the second controller setting initial values of all corresponding addresses in the second memory to zero;
performing the matching operation on each matching result matrix according to the layer identifier of the respective matching layer, the matching operation is executed by a second controller, a third queue, a fourth operator, a third counter, a fourth queue, a fifth operator, a fourth counter, a second comparator and a second memory which are sequentially connected, wherein each of the third queue and the fourth queue is a data storage structure, and a data storage rule for the third queue and the fourth queue is first-in first-out;

the matching operation comprises:

(1) the second controller acquiring row data in a matching result matrix of a current matching layer in a row-by-row manner and inputting the row data to a head of the third queue, wherein elements in the third queue are row data in the matching result matrix, and the number of data storage locations of the elements in the third queue is greater than or equal to the number of columns of a largest matching result matrix among all the matching result matrices, and a length of the third queue is equal to a number of rows of a set computation window;

(2) each sub-operator of the fourth operator performing a cumulative operation on a value at a corresponding data storage location in the inputted row data, for each row of row data inputted to the head of the third queue with the row data being in the matching result matrix of a current matching layer, wherein the fourth operator comprises a sequence of sub-operators, the number of the sub-operators is equal to the number of data storage locations of the elements in the third queue, and a location of each sub-operator is corresponding to the data storage location of the respective element in the third queue;

(3) setting the third counter to zero when each data storage location of the third queue has data stored therein;

(4) inputting an accumulative value of each sub-operator of the fourth operator to a head of the fourth queue in order of the data storage locations, wherein a length of the fourth queue is equal to a number of columns of the set computation window;

(5) the fifth operator again performing a cumulative operation on the inputted accumulative value, for each accumulative value of the respective sub-operator of the fourth operator which is inputted to the head of the fourth queue, wherein the fifth operator is a single operator;

(6) setting the value of the fourth counter to zero when each data storage location of the fourth queue has data stored therein;

(7) judging whether a value at a corresponding address in the second memory is zero, wherein an abscissa of the corresponding address is the value of the fourth operator, and an ordinate of the corresponding address is the value of the third operator; wherein if the value of the corresponding address in the second memory is zero, inputting the cumulative result in the fifth operator as well as the layer identifier of the matching layer to the corresponding address in the second memory, if the value of the corresponding address in the second memory is not zero, fetching a stored cumulative result value from the corresponding address in the second memory and inputting the stored cumulative result value to the second comparator, meanwhile, inputting the current cumulative result in the fifth operator to the second comparator;

(8) the second comparator comparing the cumulative result in the fifth operator with the cumulative result value fetched from the second memory, wherein if the cumulative result in the fifth operator is greater than or equal to the cumulative result value fetched from the second memory, storing the cumulative result in the fifth operator into a corresponding address in the second memory to replace the cumulative result value fetched from the second memory, meanwhile, storing the layer identifier of the matching layer corresponding to a current matching result matrix into a corresponding address in the second memory to replace the layer identifier originally stored at the corresponding address in the second memory;

(9) the fourth queue pushing data at its tail out of the fourth queue when each data storage location of the fourth queue has data stored therein and new data is to be inputted to the head of the fourth queue, the fifth operator performing, in the fifth operator, a cumulative operation using a value corresponding to data newly-inputted to the fourth queue, after the cumulative operation, the fifth operator performing a deduction operation on the value in the fifth operator using the data pushed out of the fourth queue, and after the deduction operation, adding 1 to the value of the fourth counter;

(10) repeating the steps (7), (8) and (9) until accumulative values in all the sub-operators of the fourth operator are all sequentially inputted to the fourth queue, so as to achieve operations for a current row of a current matching result matrix;

(11) after completion of all the steps above, the third queue pushing data at its tail out of the third queue when each data storage location of the third queue has data stored therein and new data is to be inputted to the head of the third queue again, and each sub-operator of the fourth operator performing a cumulative operation, in the sub-operator, using a value at a data storage location corresponding to newly-inputted data, and after a cumulative operation is completed, each sub-operator performing a deduction operation on the value of a corresponding sub-operator using a value at a data storage location corresponding to the data pushed out of the third queue, and adding 1 to the value of the third counter;

(12) repeating the steps (4), (5), (6), (7), (8), (9), (10) and (11) until all the operations for all rows in the matching result matrix of the current matching layer are completed; and

(13) repeating the steps (1)-(12) to complete operations for a next matching result matrix and matching layer until operations for the matching result matrices corresponding to all the matching layers are completed; wherein the second memory is configured to store a final result matrix, and each address in the final result matrix stores a largest cumulative result value and the layer identifier corresponding to the largest cumulative result value which are obtained after comparing all the cumulative results of all the matching layers at the corresponding address.

7. A two-dimensional data matching device, comprising a first operator, a first queue, a second operator, a first counter, a second queue, a third operator, a second counter, a first comparator and a first memory which are sequentially connected, wherein each of the first queue and the second queue is a data storage structure, and a data storage rule for the first queue and the second queue is first-in first-out;

wherein the first operator is configured to perform a bitwise matching operation on data in same data rows in a to-be-matched matrix a and a to-be-matched matrix b in a row-by-row manner and the first operator is configured to input a matching result of the matching operation to a head of the first queue by rows, wherein elements in the first queue are data obtained after the matching operation, and a number of data storage locations of the elements in the first queue is greater than or equal to a number of columns of each of the to-be-matched matrix a and the to-be-matched matrix b, and a length of the first queue is equal to a number of rows of a set matching window; and the first operator is configured to input a matching result of the matching operation to a head of the first queue by rows, wherein elements in the first queue are data obtained after the matching operation, and a number of data storage locations of the elements in the first queue is greater than or equal to a number of columns of each of the to-be-matched matrix a and the to-be-matched matrix b, and the length of the first queue is equal to a number of rows of a set matching window;

the second operator is configured such that each sub-operator of the second operator performs a cumulative operation using a value at a data storage location corresponding to the inputted matching result, for each matching result inputted to the head of the first queue, wherein the second operator comprises a sequence of sub-operators, a number of the sub-operators is equal to the number of data storage locations of the elements in the first queue, and a location of each sub-operator is corresponding to a data storage location of a respective element in the first queue;

the first counter is configured to set the first counter to zero when each data storage location in the first queue has data stored therein;

the second operator is further configured to input an accumulative value of each sub-operator of the second operator to a head of the second queue in order of the data storage locations, wherein a length of the second queue is equal to a number of columns of the matching window;

the third operator is further configured to perform a cumulative operation using the inputted accumulative value, for each accumulative value of a respective sub-operator of the second operator which is inputted to the head of the second queue, wherein the third operator is a single operator;

the second counter is configured to set a value of the second counter to zero when each data storage location in the second queue has data stored therein;

the third operator is further configured to input the cumulative result in the third operator to the first comparator;

the first comparator is configured to compare the cumulative result in the third operator with a pre-stored matching threshold, wherein if the cumulative result in the third operator is greater than or equal to a matching threshold, the comparison result is a first value, if the cumulative result in the third operator is smaller than the matching threshold, the comparison result is a second value, wherein the first value denotes that the comparison result is true, or 1, and the second value denotes that the comparison result is false, or 0, and the first comparator is configured to input the comparison result to a first memory to form a matching result matrix, wherein abscissas of the matching result matrix in the first memory are values of the second counter, and the ordinates of the matching result matrix are values of the first counter;

the second queue is configured to push data at its tail out of the second queue when each data storage location in the second queue has data stored therein and new data is to be inputted to the head of the second queue;

the third operator is further configured to perform, in the third operator, a cumulative operation using a newly-inputted value corresponding to a respective sub-operator of the second operator, and the third operator is further configured to perform a deduction operation on a value of the third operator using the data pushed out of the tail of the second queue after the cumulative operation, and to add 1 to the value of the second counter after the deduction operation;

the second operator is further configured such that operation values in all the sub-operators of the second operator are all sequentially inputted into the second queue after repeatedly running of the third operator, the first comparator, the second queue and the third operator, so as to achieve a complete matching between a current data row in the to-be-matched matrix a and a current data row in the to-be-matched matrix b;

the first queue is configured to push data at its tail out of the first queue when each data storage location in the first queue has data stored therein and new data is to be inputted to the head of the first queue again; and the second operator is configured that each sub-operator of the second operator performs the cumulative operation on the value at the data storage location corresponding to a data newly-inputted to the head of the first queue, and each sub-operator of the second operator is configured to perform a deduction operation on a value at a data storage location corresponding to the data pushed out of the first queue on the basis of a value of a corresponding sub-operator after the cumulative operation, and to add 1 to the first counter;

after running of the second operator, the third operator, the second counter, the third operator, the first comparator, the second queue, the third operator, the second operator and the first queue, matching operations for all data rows in the to-be-matched matrix a and all data rows in the to-be-matched matrix b are completed.

8. The device according to claim 7, wherein the device further comprises a first controller connected with the first operator;

the first controller is configured to:
acquire, according to a set order, row data at different locations in the to-be-matched matrix a and in the to-be-matched matrix b in order, wherein the location of the row data in the to-be-matched matrix a which is acquired each time is the same as that in the to-be-matched matrix b; the first controller is further configured to input the row data acquired each time to the first operator, wherein the set order at least comprises one of the following: acquiring row by row from top to bottom, acquiring row by row from bottom to top, acquiring column by column from left to right, and acquiring column by column from right to left.

9. The device according to claim 8, wherein the first controller is further configured to generate a matching layer, which comprises the following steps: acquiring a first matrix and a second matrix; storing the first matrix into a first storage area and storing the second matrix into a second storage area; moving the second matrix according to a set moving path, each time by a set unit matching distance, so as to change an overlapping region between the first matrix and the second matrix, wherein the set moving path comprises a linear path or a planar path, the linear path comprises one or more of a horizontal linear path, a vertical linear path and an oblique path, and the planar path comprises a plurality of linear paths of a same type; generating a matching layer according to an overlapping region produced by each time of movement, wherein the matching layer comprises the to-be-matched matrix a, the to-be-matched matrix b and a layer identifier of the matching layer.

10. The device according to claim 9, wherein the first controller is further configured such that the first matrix and the second matrix are each a two two-dimensional image data matrix acquired by a binocular parallel camera, wherein each two-dimensional image data matrix comprises a binary image matrix or a Boolean matrix.

11. The device according to claim 9, wherein the first controller is further configured to use row numbers and column numbers of an overlapping region in the first matrix as well as data corresponding to the row numbers and the column numbers, as the to-be-matched matrix a; to use row numbers and column numbers of an overlapping region in the second matrix as well as data corresponding to the row numbers and the column numbers, as the to-be-matched matrix b; to use a movement distance of the second matrix as a layer identifier of the matching layer; and to store the to-be-matched matrix a, the to-be-matched matrix b and the layer identifier as the matching layer.

12. The device according to claim 10, wherein the device further comprises a second controller, a third queue, a fourth operator, a third counter, a fourth queue, a fifth operator, a fourth counter, a second comparator and a second memory which are sequentially connected, wherein each of the third queue and the fourth queue is a data storage structure, and a data storage rule for the third queue and the fourth queue is first-in first-out;

the second controller is configured to acquire, in a one-by-one manner, the respective to-be-matched matrix a and to-be-matched matrix b corresponding to each matching layer to perform a matching operation, then to obtain a matching result matrix and a layer identifier of the matching layer; and the second controller is configured to perform the following operation on the each matching result matrix according to the layer identifier of the respective matching layer: setting initial values of all corresponding addresses in the second memory to zero; acquiring row data in a matching result matrix of the current matching layer in a row-by-row manner and inputting the row data to a head of the third queue, wherein elements in the third queue are row data in the matching result matrix, and the number of data storage locations of the elements in the third queue is greater than or equal to the number of columns of a largest matching result matrix among all the matching result matrices, and a length of the third queue is the number of rows of a set computation window;

the fourth operator is configured such that each sub-operator of the fourth operator performs a cumulative operation using a value at a data storage location corresponding to an inputted row data, for each row of row data inputted to the head of the third queue with the row data being in the matching result matrix of a current matching layer, wherein the fourth operator comprises a sequence of sub-operators, the number of the sub-operators is equal to a number of data storage locations of elements in the third queue, and a location of each sub-operator is corresponding to a data storage location of a respective element in the third queue;

the third counter is configured to set the third counter to zero when each data storage location in the third queue has data stored therein;

the fourth operator is further configured to input an accumulative value of each sub-operator of the fourth operator to a head of the fourth queue in order of the data storage locations, wherein a length of the fourth queue is equal to a number of columns of a set computation window;

the fifth operator is configured to perform a cumulative operation on the inputted accumulative value, for each accumulative value of the respective sub-operator of the fourth operator which is inputted to the head of the fourth queue, wherein the fifth operator is a single operator;

the fourth counter is configured to set the fourth counter to zero when each data storage location in the fourth queue has data stored therein;

the second controller is further configured to judge whether a value at a corresponding address in the second memory is zero, wherein an abscissa the address is the value of the fourth counter and an ordinate of the address is the value of the third counter, wherein if the value at the corresponding address in the second memory is zero, the second controller inputs the cumulative result in the fifth operator and the layer identifier of the matching layer to the corresponding address in the second memory, and if the value of the corresponding address in the second memory is not zero, the second controller fetches the stored cumulative result value from the corresponding address in the second memory and inputs the stored cumulative result value to the second comparator, meanwhile, inputs the current cumulative result in the fifth operator to the second comparator;

the second comparator is configured to compare the cumulative result in the fifth operator with the cumulative result value fetched from the second memory, wherein when the cumulative result in the fifth operator is greater than or equal to the cumulative result value fetched from the second memory, the second comparator stores the cumulative result in the fifth operator into the corresponding address in the second memory to replace the cumulative result value fetched from the second memory, meanwhile, the second comparator stores the layer identifier of the matching layer corresponding to the current matching result matrix into the corresponding address in the second memory to replace the layer identifier originally stored at the corresponding address in the second memory;

the fourth queue is configured to push data at its tail out of the fourth queue when each data storage location in the fourth queue has data stored therein and new data is to be inputted to the head of the fourth queue;

the fifth operator is further configured to perform, in the fifth operator, a cumulative operation using a value corresponding to a data newly-inputted to the fourth operator, and to perform, a deduction operation on the value of the fifth operator using the data pushed out of the fourth queue after the cumulative operation, and to add 1 to the value of the fourth counter after the deduction operation;

the fourth operator is further configured such that operation values in all the sub-operators of the fourth operator are all sequentially inputted into the fourth queue after repeated running of the second controller, the second comparator, the fourth queue and the fifth operator, so as to achieve operations for the current data row in the matching result matrix;

the third queue is configured to push data at its tail out of the third queue when each data storage location in the third queue has data stored therein and new data is to be inputted to the head of the third queue again;

the fourth operator further is configured such that each sub-operator of the fourth operator performs the cumulative operation, in the sub-operator, using a newly-inputted value at a corresponding data storage location, and after the cumulative operation is completed, each sub-operator performs a deduction operation on a value of the corresponding sub-operator using a value at a data storage location corresponding to the data pushed out of the third queue, and 1 is added to the value of the third counter; and the second controller is further configured to repeatedly trigger running of the fourth operator, the fifth operator, the fourth counter, the second controller, the second comparator, the fourth queue, the fifth operator, the fourth operator, the third queue and the fourth operator until matching operations for all rows in the matching result matrix of a current matching layer are completed; the second controller is further configured to repeatedly trigger running from the second controller to the fourth operator to achieve the operations for a next matching result matrix and matching layer until operations for matching result matrices corresponding to all matching layers are completed, wherein the second memory is configured to store a final matching result matrix, and each address in the final matching result matrix stores a largest cumulative result value and its layer identifier which are obtained after comparing between cumulative results of all matching layers at the corresponding addresses.

13. A two-dimensional data matching logic circuit, comprising the two-dimensional data matching device according to claim 7.

14. The method according to claim 4, wherein the step of the first controller generating a matching layer according to an overlapping region produced by each time of movement comprises:
the first controller using row numbers and column numbers of an overlapping region in the first matrix as well as data corresponding to the row numbers and the column numbers, as the to-be-matched matrix a;
the first controller using row numbers and column numbers of an overlapping region in the second matrix as well as data corresponding to the row numbers and the column numbers, as the to-be-matched matrix b;
the first controller using a movement distance of the second matrix as a layer identifier of the matching layer; and
the first controller storing the to-be-matched matrix a, the to-be-matched matrix b and the layer identifier as the matching layer.

15. The device according to claim 10, wherein the first controller is further configured to use row numbers and column numbers of an overlapping region in the first matrix as well as data corresponding to row numbers and column numbers, as the to-be-matched matrix a; to use row numbers and column numbers of an overlapping region in the second matrix as well as data corresponding to the row numbers and the column numbers, as the to-be-matched matrix b; to use a movement distance of the second matrix as a layer identifier of the matching layer; and to store the to-be-matched matrix a, the to-be-matched matrix b and the layer identifier as the matching layer.

16. The two-dimensional data matching logic circuit according to claim 13, wherein the device further comprises a first controller connected with the first operator;
the first controller is configured to:
acquire, according to a set order, row data at different locations in the to-be-matched matrix a and in the to-be-matched matrix b in order, wherein a location of row data in the to-be-matched matrix a which is acquired each time is the same as that in the to-be-matched matrix b; the first controller is further configured to input the row data acquired each time to the first operator, wherein the set order at least comprises one of the following: acquiring row by row from top to bottom, acquiring row by row from bottom to top, acquiring column by column from left to right, and acquiring column by column from right to left.

17. The two-dimensional data matching logic circuit according to claim 16, wherein the first controller is further configured to generate a matching layer, which comprises the following steps: acquiring a first matrix and a second matrix; storing the first matrix into a first storage area and storing the second matrix into a second storage area; moving the second matrix according to a set moving path, each time by a set unit matching distance, so as to change an overlapping region between the first matrix and the second matrix, wherein the set moving path comprises a linear path or a planar path, the linear path comprises one or more of a horizontal linear path, a vertical linear path and an oblique path, and the planar path comprises a plurality of linear paths of a same type; generating a matching layer according to an overlapping region produced by each time of movement, wherein the matching layer comprises the to-be-matched matrix a, the to-be-matched matrix b and a layer identifier of the matching layer.

18. The two-dimensional data matching logic circuit according to claim 17, wherein the first controller is further configured such that the first matrix and the second matrix are each a two two-dimensional image data matrix acquired by a binocular parallel camera, wherein each two-dimensional image data matrix comprises a binary image matrix or a Boolean matrix.

19. The two-dimensional data matching logic circuit according to claim 17, wherein the first controller is further configured to use row numbers and column numbers of an overlapping region in the first matrix as well as data corresponding to the row numbers and the column numbers, as the to-be-matched matrix a; to use row numbers and column numbers of an overlapping region in the second matrix as well as data corresponding to the row numbers and the column numbers, as the to-be-matched matrix b; to use a movement distance of the second matrix as a layer identifier of the matching layer; and to store the to-be-matched matrix a, the to-be-matched matrix b and the layer identifier as the matching layer.

20. The two-dimensional data matching logic circuit according to claim 18, wherein the first controller is further configured to use row numbers and column numbers of an overlapping region in the first matrix as well as data corresponding to the row numbers and the column numbers, as the to-be-matched matrix a; to use row numbers and column numbers of an overlapping region in the second matrix as well as data corresponding to the row numbers and the column numbers, as the to-be-matched matrix b; to use a movement distance of the second matrix as a layer identifier of the matching layer; and to store the to-be-matched matrix a, the to-be-matched matrix b and the layer identifier as the matching layer.

* * * * *